US008886383B2

(12) United States Patent
Hyde et al.

(10) Patent No.: US 8,886,383 B2
(45) Date of Patent: Nov. 11, 2014

(54) AUTOMATED SYSTEMS, DEVICES, AND METHODS FOR TRANSPORTING AND SUPPORTING PATIENTS

(71) Applicant: Elwha LLC, Bellevue, WA (US)

(72) Inventors: Roderick A. Hyde, Redmond, WA (US); Stephen L. Malaska, Redmond, WA (US)

(73) Assignee: Elwha LLC, Bellevue, WA (US)

( * ) Notice: Subject to any disclaimer, the term of this patent is extended or adjusted under 35 U.S.C. 154(b) by 176 days.

(21) Appl. No.: 13/630,531

(22) Filed: Sep. 28, 2012

(65) Prior Publication Data

US 2014/0090172 A1 Apr. 3, 2014

Related U.S. Application Data

(63) Continuation of application No. 13/630,087, filed on Sep. 28, 2012.

(51) Int. Cl.
*A61G 7/08* (2006.01)

(52) U.S. Cl.
USPC .............................. 701/24; 701/23; 701/410

(58) Field of Classification Search
USPC .......... 701/23, 24, 25, 26, 400, 408, 409, 420, 701/450, 451, 468, 487, 488
See application file for complete search history.

(56) References Cited

U.S. PATENT DOCUMENTS

| 3,876,255 | A | 4/1975 | Ilon |
| 4,137,984 | A | 2/1979 | Jennings et al. |
| 5,400,244 | A | 3/1995 | Watanabe et al. |
| 5,631,642 | A * | 5/1997 | Brockelsby et al. .......... 340/993 |
| 6,108,592 | A | 8/2000 | Kurtzberg et al. |
| 6,327,219 | B1 | 12/2001 | Zhang et al. |
| 6,658,680 | B2 | 12/2003 | Osborne et al. |
| 6,691,346 | B2 | 2/2004 | Osborne et al. |
| 6,749,034 | B2 | 6/2004 | Vogel et al. |
| 6,877,572 | B2 | 4/2005 | Vogel et al. |
| 6,957,461 | B2 | 10/2005 | Osborne et al. |

(Continued)

FOREIGN PATENT DOCUMENTS

WO    WO 2012/093985 A1    7/2012

OTHER PUBLICATIONS

Banad et al.; "Robotics and Computer Vision—Capstone Image Based Person Following Robot Final Report"; rutgers.edu; May 2, 2011; pp. 1-30; located at http://www.ece.rutgers.edu/~kdana/Capstone2011/Capstone_Design_Reports_files/Adarsh_Banad_Hardikkumar_Patel_Amit_Sinha_Final_Reports.pdf.

(Continued)

*Primary Examiner* — Richard Camby

(57) ABSTRACT

Systems, devices, and methods are described for moving a patient to and from various locations, care units, etc., within a care facility. For example a transport and support vehicle includes a body structure including a plurality of rotatable members operable to frictionally interface the vehicle to a travel path and to move the vehicle along the travel path, and a surface structured and dimensioned to support an individual subject. A transport and support vehicle can include, for example, an imager operably coupled to one or more of a power source, a steering assembly, one or more of the plurality of rotatable members, etc., and having one or more modules operable to control the power source, steering assembly, one or more of the plurality of rotatable members, etc., so as to maintain an authorized operator in the image zone.

21 Claims, 6 Drawing Sheets

(56) References Cited

U.S. PATENT DOCUMENTS

| | | |
|---|---|---|
| 6,978,500 B2 | 12/2005 | Osborne et al. |
| 7,014,000 B2 | 3/2006 | Kummer et al. |
| 7,083,012 B2 | 8/2006 | Vogel et al. |
| 7,090,041 B2 | 8/2006 | Vogel et al. |
| 7,171,293 B2 | 1/2007 | Ichikawa et al. |
| 7,171,708 B2 | 2/2007 | Osborne et al. |
| 7,195,253 B2 | 3/2007 | Vogel et al. |
| 7,211,980 B1 | 5/2007 | Bruemmer et al. |
| 7,273,115 B2 | 9/2007 | Kummer et al. |
| 7,284,626 B2 | 10/2007 | Heimbrock et al. |
| 7,383,107 B2 | 6/2008 | Fehr et al. |
| 7,407,024 B2 | 8/2008 | Vogel et al. |
| 7,454,805 B2 | 11/2008 | Osborne et al. |
| 7,499,774 B2 | 3/2009 | Barrett et al. |
| 7,551,980 B2 | 6/2009 | Sakagami et al. |
| 7,554,282 B2 | 6/2009 | Nakamoto |
| 7,594,556 B1 | 9/2009 | Panzarella et al. |
| 7,789,187 B2 | 9/2010 | Zerhusen et al. |
| 7,828,092 B2 | 11/2010 | Vogel et al. |
| 7,882,582 B2 | 2/2011 | Kappeler et al. |
| 7,886,377 B2 | 2/2011 | Hamberg et al. |
| 7,894,939 B2 | 2/2011 | Zini et al. |
| 7,926,131 B2 | 4/2011 | Menkedick et al. |
| 7,953,537 B2 | 5/2011 | Bhai |
| 7,996,109 B2 | 8/2011 | Zini et al. |
| 8,010,230 B2 | 8/2011 | Zini et al. |
| 8,046,160 B2 | 10/2011 | Carter et al. |
| 8,051,931 B2 | 11/2011 | Vogel et al. |
| 8,079,433 B2 | 12/2011 | Teague et al. |
| 8,106,616 B1 | 1/2012 | Theobald |
| 8,204,624 B2 | 6/2012 | Zini et al. |
| 8,522,320 B2 | 8/2013 | Kleve et al. |
| 2002/0002742 A1 | 1/2002 | Osborne et al. |
| 2002/0066142 A1 | 6/2002 | Osborne et al. |
| 2002/0088055 A1 | 7/2002 | Vogel et al. |
| 2002/0097145 A1 | 7/2002 | Tumey et al. |
| 2003/0102172 A1 | 6/2003 | Kummer et al. |
| 2004/0104702 A1 | 6/2004 | Nakadai et al. |
| 2004/0128765 A1 | 7/2004 | Osborne et al. |
| 2004/0159473 A1 | 8/2004 | Vogel et al. |
| 2004/0163175 A1 | 8/2004 | Vogel et al. |
| 2004/0177445 A1 | 9/2004 | Osborne et al. |
| 2005/0199430 A1 | 9/2005 | Vogel et al. |
| 2005/0236193 A1 | 10/2005 | Vogel et al. |
| 2006/0075560 A1 | 4/2006 | Osborne et al. |
| 2006/0096029 A1 | 5/2006 | Osborne et al. |
| 2006/0108158 A1 | 5/2006 | Kummer et al. |
| 2006/0247847 A1 | 11/2006 | Carter et al. |
| 2006/0249320 A1 | 11/2006 | Carter et al. |
| 2007/0027579 A1 | 2/2007 | Suzuki et al. |
| 2007/0129849 A1 | 6/2007 | Zini et al. |
| 2007/0158921 A1 | 7/2007 | Vogel et al. |
| 2007/0261924 A1 | 11/2007 | Lindberg et al. |
| 2008/0086815 A1 | 4/2008 | Kappeler et al. |
| 2008/0141459 A1 | 6/2008 | Hamberg et al. |
| 2008/0228520 A1 | 9/2008 | Day et al. |
| 2008/0265821 A1 | 10/2008 | Theobald |
| 2008/0283329 A1 | 11/2008 | Vogel et al. |
| 2009/0188731 A1 | 7/2009 | Zerhusen et al. |
| 2009/0217456 A1 | 9/2009 | Lempen et al. |
| 2009/0222184 A1 | 9/2009 | Bhai |
| 2009/0313758 A1 | 12/2009 | Menkedick et al. |
| 2010/0187779 A1 | 7/2010 | Potter |
| 2010/0234990 A1 | 9/2010 | Zini et al. |
| 2010/0234991 A1 | 9/2010 | Zini et al. |
| 2011/0026770 A1 | 2/2011 | Brookshire |
| 2011/0035883 A1 | 2/2011 | Vogel et al. |
| 2011/0083270 A1 | 4/2011 | Bhai et al. |
| 2011/0087416 A1 | 4/2011 | Patmore |
| 2011/0137457 A1 | 6/2011 | Zini et al. |
| 2011/0162141 A1 | 7/2011 | Lemire et al. |
| 2011/0163160 A1 | 7/2011 | Zini et al. |
| 2011/0172850 A1 | 7/2011 | Paz-Meidan et al. |
| 2011/0231075 A1 | 9/2011 | Bhai |
| 2012/0012408 A1 | 1/2012 | Vogel et al. |
| 2012/0029697 A1 | 2/2012 | Ota et al. |
| 2012/0035823 A1 | 2/2012 | Carter et al. |
| 2012/0075464 A1 | 3/2012 | Derenne et al. |
| 2012/0102434 A1 | 4/2012 | Zerhusen et al. |
| 2012/0173045 A1 | 7/2012 | Conroy |
| 2012/0182392 A1 | 7/2012 | Kearns et al. |
| 2012/0185094 A1 | 7/2012 | Rosenstein et al. |
| 2012/0197439 A1 | 8/2012 | Wang et al. |
| 2012/0197464 A1 | 8/2012 | Wang et al. |
| 2012/0283872 A1 | 11/2012 | Hu et al. |
| 2012/0290152 A1 | 11/2012 | Cheung et al. |
| 2012/0316676 A1 | 12/2012 | Fouillade et al. |
| 2013/0035790 A1 | 2/2013 | Olivier, III et al. |
| 2013/0226344 A1 | 8/2013 | Wong et al. |
| 2013/0226601 A1 | 8/2013 | Razmi et al. |

OTHER PUBLICATIONS

PCT International Search Report; International App. No. PCT/US2013/060564; Feb. 14, 2014; pp. 1-2.

PCT International Search Report; International App. No. PCT/US2013/060558; Feb. 14, 2014; pp. 1-2.

\* cited by examiner

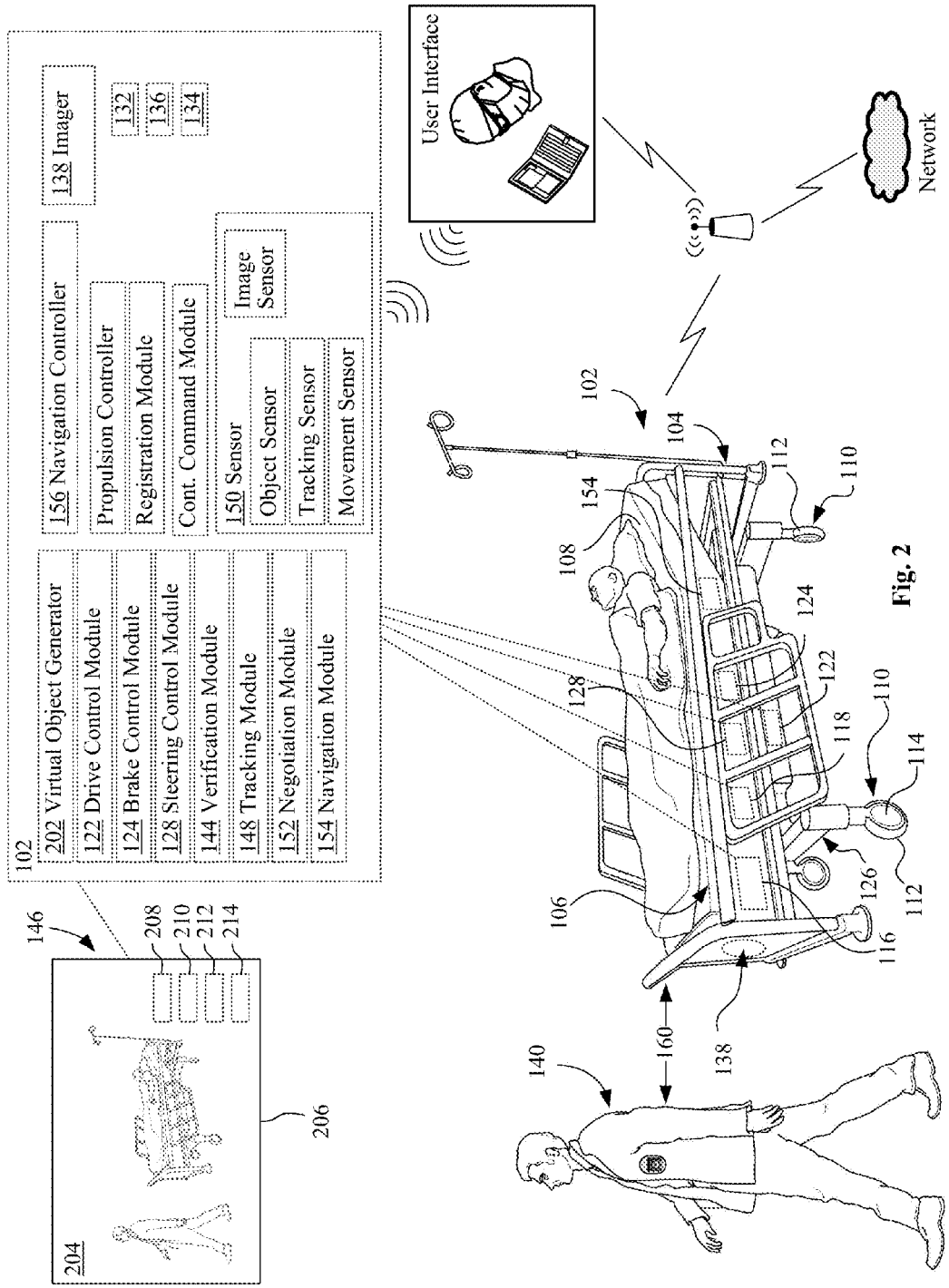

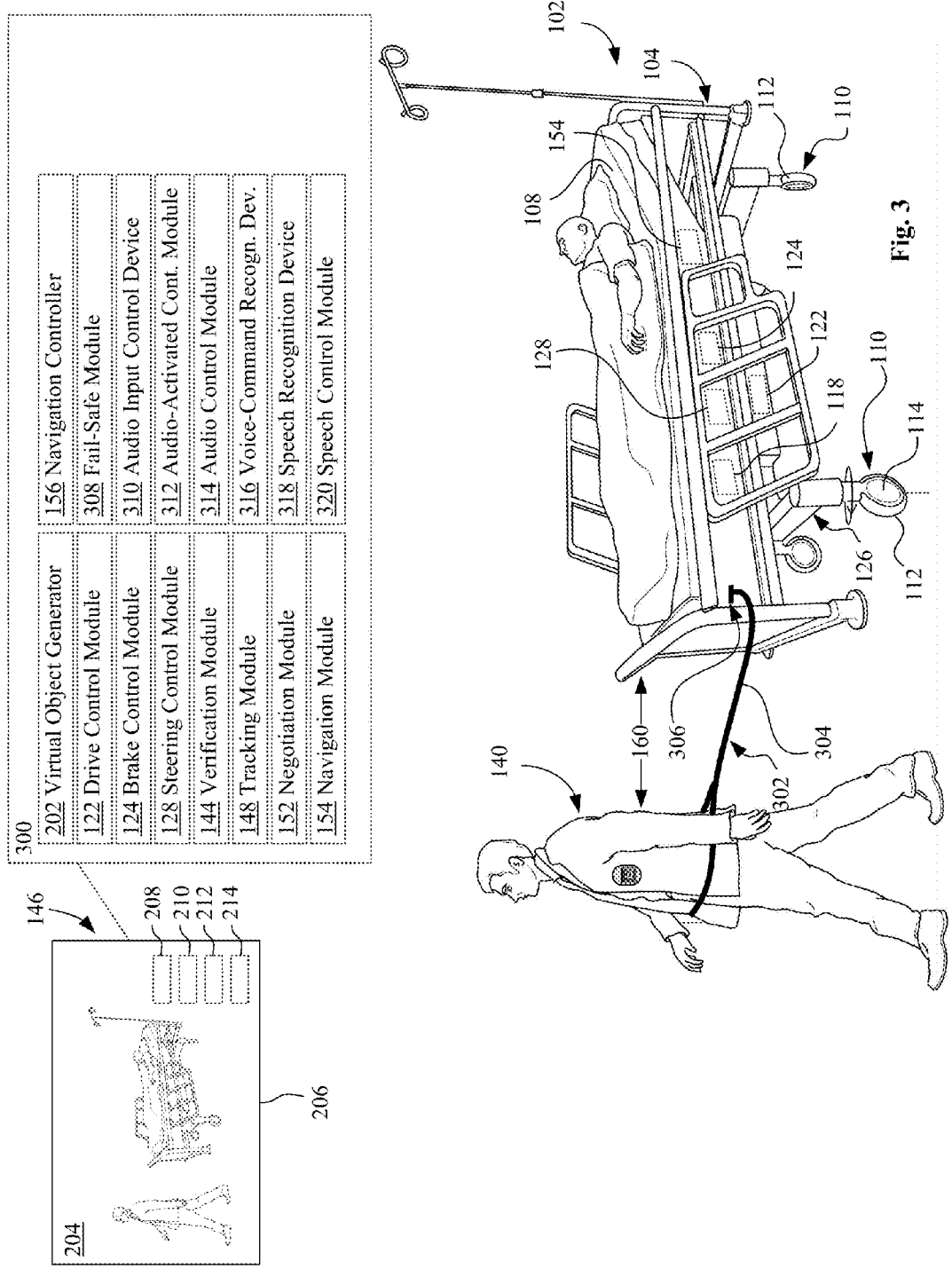

Fig. 4

402 one or more instructions for detecting an operator-guide identification device associated with operator-guide one or more instructions for acquiring operator-guide verification data from the operator-guide identification device, the operator-guide verification data to be acquired including data indicative of at least one of an operator-guide authorization status, an operator-guide identity, or an operator-guide reference guidance data one or more instructions for generating one or more control commands for maintaining a self-propelled operator-guided vehicle at target separation from the operator-guide identification device one or more instructions for detecting a location of the operator-guide identification device associated with the operator-guide one or more instructions for generating one or more control commands for maintaining the self-propelled operator-guided vehicle at a target separation from the operator-guide identification device responsive to a change of location of the operator-guide identification device relative to the self-propelled operator-guided vehicle one or more instructions for determining a location of the operator-guide identification device associated with the operator-guide relative to the self-propelled operator-guided vehicle one or more instructions for determining a velocity difference between the operator-guide identification device and the self-propelled operator-guided vehicle a non-transitory signal-bearing medium bearing one or more instructions for controlling one or more of propulsion, braking, or steering responsive to detected velocity difference between the operator-guide identification device and the self-propelled operator-guided vehicle

- one or more instructions for acquiring physical movement image data of a human operator within an operator-guide zone

- one or more instructions for determining operator-guide verification data for the human operator within the operator-guide zone based on the physical movement image data

- one or more instructions for mapping one or more physical movements of the human operator within the operator-guide zone to at least one input correlated with one or more navigation control commands for controlling a self-propelled operator-guided bed

- one or more instructions for navigating the self-propelled operator-guided bed based on the one or more navigation control commands

- one or more instructions for generating a virtual representation of at least one of a locality of the human operator within the operator-guide zone or a locality of the self-propelled operator-guided bed on a virtual display

- one or more instructions for generating a virtual representation of the one or more physical movements on a virtual display bearing one or more instructions for generating a virtual representation of the one or more navigation control commands on a virtual display

- one or more instructions for determining a travel route based on one or more detected physical movements of the human operator within the operator-guide zone

- one or more instructions for determining at least a first travel destination based on the one or more detected physical movements of the human operator within the operator-guide zone

- one or more instructions for registering a physical location of the human operator within the operator-guide zone relative the self-propelled operator-guided bed, and generating registration data

- one or more instructions for generating a virtual representation of at least one of a locality of the human operator within the operator-guide zone or a locality of the self-propelled operator-guided bed within a physical space on a virtual display based on the registration data

- one or more instructions for controlling one or more of propulsion, braking, or steering of the self-propelled operator-guided bed based on the to at least one input

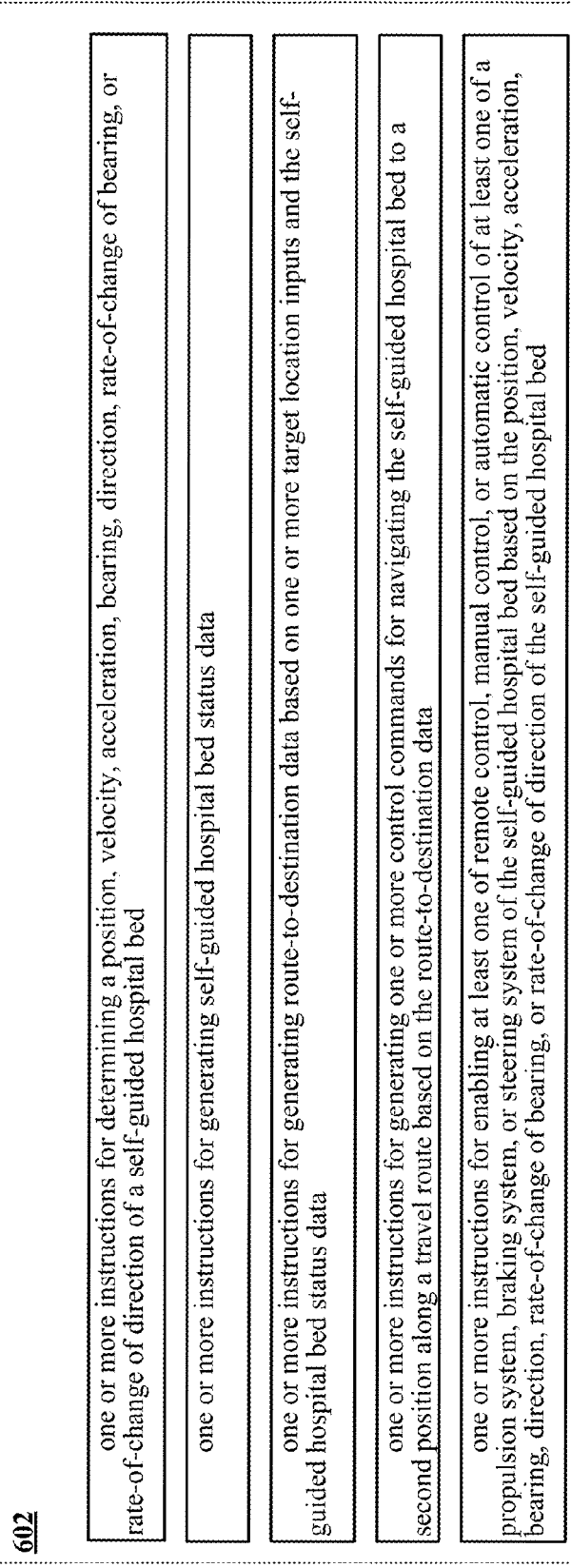

Fig. 6

602 one or more instructions for determining a position, velocity, acceleration, bearing, direction, rate-of-change of bearing, or rate-of-change of direction of a self-guided hospital bed one or more instructions for generating self-guided hospital bed status data one or more instructions for generating route-to-destination data based on one or more target location inputs and the self-guided hospital bed status data one or more instructions for generating one or more control commands for navigating the self-guided hospital bed to a second position along a travel route based on the route-to-destination data one or more instructions for enabling at least one of remote control, manual control, or automatic control of at least one of a propulsion system, braking system, or steering system of the self-guided hospital bed based on the position, velocity, acceleration, bearing, direction, rate-of-change of bearing, or rate-of-change of direction of the self-guided hospital bed

AUTOMATED SYSTEMS, DEVICES, AND METHODS FOR TRANSPORTING AND SUPPORTING PATIENTS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 13/630,087, entitled AUTOMATED SYSTEMS, DEVICES, AND METHODS FOR TRANSPORTING AND SUPPORTING PATIENTS, naming Roderick A. Hyde and Stephen L. Malaska as inventors, filed 28, Sep., 2012 which is currently co-pending or is an application of which a currently co-pending application is entitled to the benefit of the filing date.

RELATED APPLICATIONS

U.S. patent application Ser. No. 13/630,412, entitled AUTOMATED SYSTEMS, DEVICES, AND METHODS FOR TRANSPORTING AND SUPPORTING PATIENTS, naming Roderick A. Hyde and Stephen L. Malaska as inventors, filed 28, Sep., 2012, and is related to the present application and which is a continuation of U.S. patent application Ser. No. 13/630,087, entitled AUTOMATED SYSTEMS, DEVICES, AND METHODS FOR TRANSPORTING AND SUPPORTING PATIENTS, naming Roderick A. Hyde and Stephen L. Malaska as inventors, filed 28, Sep., 2012.

U.S. patent application Ser. No. 13/630,551, entitled AUTOMATED SYSTEMS, DEVICES, AND METHODS FOR TRANSPORTING AND SUPPORTING PATIENTS, naming Roderick A. Hyde and Stephen L. Malaska as inventors, filed 28, Sep., 2012, and is related to the present application and which is a continuation of U.S. patent application Ser. No. 13/630,087, entitled AUTOMATED SYSTEMS, DEVICES, AND METHODS FOR TRANSPORTING AND SUPPORTING PATIENTS, naming Roderick A. Hyde and Stephen L. Malaska as inventors, filed 28, Sep., 2012.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In an aspect, the present disclosure is directed to, among other things, a vehicle for transporting an individual subject. In an embodiment, the vehicle includes a body structure including a plurality of rotatable members operable to frictionally interface the vehicle to a travel path and to move the vehicle along the travel path, and a surface structured and dimensioned to support an individual subject. In an embodiment, the vehicle includes a steering assembly operably coupled to at least one of the rotatable members. In an embodiment, the vehicle includes a power source operably coupled to one or more of the plurality of rotatable members and configured to rotate at least one of the plurality of rotatable members. In an embodiment, the vehicle includes an imager operable to image a person within an image zone, and a verification module for determining whether the person in the image zone is an authorized operator of the vehicle. In an embodiment, the imager is operably coupled to the power source and the body structure, the imager including one or more modules having circuitry operable to control the power source and steering assembly so as to maintain the authorized operator in the image zone.

In an aspect, the present disclosure is directed to, among other things, a self-propelled operator-guided bed. In an embodiment, the self-propelled operator-guided bed includes an operator-authorization device having a communication interface that acquires operator-guide verification information from an identification device associated with an operator-guide. In an embodiment, the operator-authorization device includes one or more tracking sensors operable to track one or more locations of the identification device. In an embodiment, the operator-authorization device includes one or more tracking sensors operable to track information associated with the operator-guide and the identification device carried by, worn by, affixed to the operator, or the like. In an embodiment, the self-propelled operator-guided bed includes a bedframe structure (e.g., a bed, a bedframe, a steerable bed, a steerable bedframe, and the like) having a surface configured (e.g., arranged, adapted, constructed, dimensioned, sized, structured, having structures, etc.) to support a patient.

In an embodiment, the bedframe structure is operably coupled to a transport assembly having a plurality of rotatable members operable to frictionally interface the self-propelled operator-guided bed to a travel path and to move the self-propelled operator-guided bed along the travel path. In an embodiment, the self-propelled operator-guided bed includes a steering assembly operable to vary a steering angle, an orientation, a velocity, etc., of at least one of the plurality of rotatable members. In an embodiment, the self-propelled operator-guided bed includes a powertrain having a power source, motor, transmission, drive shafts, differentials, a final drive etc., for driving one or more of the plurality of rotatable members. In an embodiment, the self-propelled operator-guided bed includes a navigation controller operably coupled to the operator-authorization device and the bedframe structure. In an embodiment, the navigation controller includes a module having circuitry operable to provide a control signal to navigate the bedframe structure along a travel path based on one or more detected locations of the identification device.

In an aspect, the present disclosure is directed to, among other things, a vehicle for transporting an individual subject. In an embodiment, the vehicle includes a body structure, an operator-authorization device, and an imager. In an embodiment, the body structure includes a surface so dimensioned, configured, and arranged to be adapted to support an individual subject, and a plurality of rotatable members operable to frictionally interface the vehicle to a travel path and to move the vehicle along the travel path. In an embodiment, the operator-authorization device includes an input interface operable to acquire verification information associated with an operator (e.g., a guide, a human operator, an operator, or the like), the operator being different from the individual subject. In an embodiment, the operator-authorization device includes a verification module for determining whether the operator is an authorized operator. In an embodiment, the imager includes one or more modules having circuitry for operably coupling the imager to at least one of the power source and the steering assembly, and for operating the power source and steering assembly so as to maintain the authorized operator in the image zone based on one or more inputs from the imager. In an embodiment, the vehicle includes a power source operably coupled to one or more of the plurality of rotatable members.

In an aspect, the present disclosure is directed to, among other things, a self-propelled operator-guided vehicle system. In an embodiment, the self-propelled operator-guided vehicle system includes one or more self-propelled operator-guided vehicles, each including a bedframe structure having a surface configured to support a patient. In an embodiment, the bedframe structure includes a transport assembly having a plurality of rotatable members operable to frictionally interface the vehicle to a travel path and to move the vehicle along the travel path. In an embodiment, the self-propelled operator-guided vehicle system includes a navigation system configured to vary one or more of propulsion, braking, or steering angle of at least one of the plurality of rotatable members.

In an embodiment, the self-propelled operator-guided vehicle system includes an operator-authorization device operably coupled to the transport assembly and having one or more sensors and a communication interface. In an embodiment, the one or more sensors are operable to detect an operator-guide identification device associated with an operator-guide. In an embodiment, the communication interface is configured to acquire operator-guide verification information from the operator-guide identification device. In an embodiment, the operator-authorization device is configured to acquire information indicative of at least one of an operator-guide authorization status, an operator-guide location, an operator-guide identity, an operator-guide reference physical movement, access status, and the like. In an embodiment, the operator-authorization device is configured to generate one or more control commands for causing the transport assembly to maintaining the self-propelled operator-guided vehicle at a target separation from the authorized operator-guide identification device, based on the at least one of the operator-guide authorization status, the operator-guide identity, and the operator-guide reference physical movement information.

In an aspect, the present disclosure is directed to, among other things, an article of manufacture including a non-transitory signal-bearing medium bearing one or more instructions for causing a system, computing device, processor, etc., to detect an operator-guide identification device associated with operator-guide. In an embodiment, the article of manufacture includes a non-transitory signal-bearing medium bearing one or more instructions for causing a system, computing device, processor, etc., to acquire operator-guide verification information from the operator-guide identification device. In an embodiment, the operator-guide verification information to be acquired includes information indicative of at least one of an operator-guide authorization status, an operator-guide identity, and an operator-guide reference guidance information. In an embodiment, the article of manufacture includes a non-transitory signal-bearing medium bearing one or more instructions for causing a system, computing device, processor, etc., to generate one or more control commands for maintaining a self-propelled operator-guided vehicle at target separation from the operator-guide identification device. In an embodiment, the article of manufacture includes a non-transitory signal-bearing medium bearing one or more instructions for causing a system, computing device, processor, etc., to detect a location of the operator-guide identification device associated with the operator-guide. In an embodiment, the article of manufacture includes a non-transitory signal-bearing medium bearing one or more instructions for causing a system, computing device, processor, etc., to generate one or more control commands for maintaining the self-propelled operator-guided vehicle at a target separation from the operator-guide identification device responsive to a change of location of the operator-guide identification device relative to the self-propelled operator-guided vehicle.

In an aspect, the present disclosure is directed to, among other things, a self-propelled operator-guided vehicle for transporting and supporting at least one individual subject. In an embodiment, the self-propelled operator-guided vehicle includes an operator-authorization device having one or more image sensors. In an embodiment, the one or more image sensors are operable to acquire image information of an operator within an operator-guide zone. In an embodiment, the self-propelled operator-guided vehicle includes a verification module for determining whether the operator is an authorized operator based on the image information. In an embodiment, the self-propelled operator-guided vehicle includes a bedframe structure having a surface configured to support an individual subject, and a transport assembly having a plurality of rotatable members operable to frictionally interface a self-propelled operator-guided vehicle to a travel path and to move the vehicle along the travel path. In an embodiment, the self-propelled operator-guided vehicle includes a steering assembly operable to vary a steering angle, an orientation, a velocity, etc., of at least one of the plurality of rotatable members.

In an embodiment, the self-propelled operator-guided vehicle includes a power source and a motor for driving one or more of the plurality of rotatable members. In an embodiment, the self-propelled operator-guided vehicle includes an operator-guided vehicle navigation controller operably coupled to at least one of the operator-authorization device, the steering assembly, the power source, and the motor. In an embodiment, the operator-guided vehicle navigation controller includes a control command module operable to determine physical movement information from the image information. In an embodiment, the operator-guided vehicle navigation controller includes a control command module operable to map one or more detected physical movements of the authorized operator within the operator-guide zone to at least one input correlated with one or more navigation control commands for controlling the self-propelled operator-guided vehicle, based on the physical movement information.

In an aspect, the present disclosure is directed to, among other things, an article of manufacture including a non-transitory signal-bearing medium bearing one or more instructions for acquiring physical movement image information of an operator within an operator-guide zone. In an embodiment, the article of manufacture includes a non-transitory signal-bearing medium bearing one or more instructions for determining operator-guide verification information for the operator within the operator-guide zone based on the physical movement image information. In an embodiment, the article of manufacture includes a non-transitory signal-bearing medium bearing one or more instructions for mapping one or more detected physical movements of the operator within the operator-guide zone to at least one input correlated with one or more navigation control commands for controlling a self-propelled operator-guided bed.

In an aspect, the present disclosure is directed to, among other things, a self-propelled hospital bed navigation control system including an operator-guided vehicle navigation controller. In an embodiment, the operator-guided vehicle navigation controller includes one or more sensors operable to detect at least one operator within an operator-guide zone associated with a self-propelled operator-guided hospital bed. In an embodiment, the self-propelled operator-guided hospital bed includes a bedframe structure having a surface configured to support an individual subject. In an embodiment, the self-propelled operator-guided hospital bed includes a plurality of rotatable members operable to frictionally interface the vehicle to a travel path and to move the vehicle along the travel path. In an embodiment, the self-propelled operator-guided hospital bed includes a steering assembly operable to vary a steering angle, an orientation, a velocity, etc., of at least one of the plurality of rotatable members. In an embodiment, the self-propelled operator-guided hospital bed includes a power source and a motor for driving one or more of the plurality of rotatable members. In an embodiment, the self-propelled hospital bed navigation control system includes an operator movement mapping module operably coupled to the operator-guided vehicle navigation controller and to at least one of the plurality of rotatable members, the power source, and the motor.

In an embodiment, the operator movement mapping module is configured to map one or more detected physical movements of the operator within the operator-guide zone to at least one input correlated with one or more navigation control commands for controlling the self-propelled operator-guided vehicle. In an embodiment, the operator movement mapping module is configured to generate a control signal to at least one of the plurality of rotatable members, the power source, a braking mechanism, and the motor to navigate the self-propelled operator-guided vehicle based on the one or more navigation control commands.

In an aspect, the present disclosure is directed to, among other things, a self-propelled hospital bed including an operator-guided vehicle navigation controller having an audio-activated control module operable to receive an audio input. In an embodiment, the self-propelled hospital bed includes a bedframe structure operably coupled to the operator-guided vehicle navigation controller. In an embodiment, the bedframe structure includes a surface configured to support an individual subject, and a plurality of rotatable members operable to frictionally interface the self-propelled hospital bed to a travel path and to move the vehicle along the travel path. In an embodiment, the self-propelled hospital bed includes a bedframe structure having a steering assembly operable to vary a steering angle, an orientation, a velocity, etc., of at least one of the plurality of rotatable members. In an embodiment, the self-propelled hospital bed includes a bedframe structure having a power source, and a motor for driving one or more of the plurality of rotatable members. In an embodiment, the operator-guided vehicle navigation controller includes an audio input mapping module having circuitry operable to correlate an audio input to at least one navigation control command for controlling at least one of propulsion, braking, and steering of the self-propelled hospital bed.

In an aspect, the present disclosure is directed to, among other things, a self-propelled hospital bed controller system, including an operator-guided vehicle navigation controller. In an embodiment, the operator-guided vehicle navigation controller includes an audio-activated control module having one or more transducers operable to receive an audio input. In an embodiment, the operator-guided vehicle navigation controller includes an audio input mapping module having circuitry operable to correlate an audio input to at least one navigation control command for controlling at least one of propulsion, braking, and steering of the self-propelled hospital bed. In an embodiment, the operator-guided vehicle navigation controller includes a speech recognition control module operable to receive speech input. In an embodiment, the operator-guided vehicle navigation controller includes a voice control module operable to receive a voice input.

In an aspect, the present disclosure is directed to, among other things, a self-propelled, operator-guided vehicle for transporting and supporting at least one individual subject including an operator-guide verification and navigation controller having one or more sensors operable to acquire at least one digital image of an operator within an operator-guide zone. In an embodiment, the self-propelled hospital bed includes an operator-guide verification operably coupled to a navigation controller. In an embodiment, navigation controller includes one or more modules having circuitry operable to control a power source, a steering assembly, or the like so as to maintain the self-propelled hospital bed along a travel route.

In an embodiment, the body structure includes a surface configured to support an individual subject, the body structure including at least three wheels and a steering assembly. In an embodiment, the self-propelled hospital bed includes a power source operably coupled to one or more of the at least three wheels. In an embodiment, the operator-guide verification and navigation controller includes a module having circuitry operable to map one or more detected physical movements of the operator within the operator-guide zone, and imaged in the at least one digital image, to at least one input correlated with one or more navigation control commands for controlling the self-propelled operator-guided vehicle.

In an aspect, the present disclosure is directed to, among other things, a self-propelled operator-guided vehicle control system including an operator-authorization device having one or more sensors operable to detect one or more physical movements of the operator within the operator-guide zone. In an embodiment, the operator-authorization device is operably coupled to one or more sensors and configured to detect a location of the operator within the operator-guide zone.

In an embodiment, the self-propelled operator-guided vehicle control system includes a self-propelled operator-guided vehicle navigation controller having circuitry operable to provide a control signal to map the one or more detected physical movements of the operator within the operator-guide zone to at least one input correlated with one or more navigation control commands for controlling the self-propelled operator-guided vehicle. In an embodiment, the self-propelled operator-guided vehicle navigation controller includes circuitry operable to navigate a self-propelled operator-guided vehicle based on the one or more navigation control commands.

In an aspect, the present disclosure is directed to, among other things, a self-propelled operator-guided vehicle capable of transporting and supporting at least one person and operable to identify, follow, monitor, etc., an operator within an operator-guide zone using real-time automatic image recognition. In an embodiment, the self-propelled operator-guided vehicle is operably coupled to a real-time object recognition device. In an embodiment, the real-time object recognition device is configured to identify groups of pixels indicative of one or more physical movements associated with an operator within an operator-guide zone imaged in the at least one digital image. In an embodiment, the real-time object recognition device is configured to generate one or more connected components of a graph representative of groups of pixels indicative of the one or more physical movements associated with the operator imaged in the at least one digital image. In an embodiment, the real-time object recognition device is configured to correlate the one or more connected components of the graph to at least one input associated with one or more navigation control commands for controlling the self-propelled operator-guided vehicle.

In an aspect, the present disclosure is directed to, among other things, a self-guided, patient support and transport vehicle including a self-guided-vehicle navigation controller. In an embodiment, the self-guided-vehicle navigation controller includes a route-to-destination control module having circuitry operable to generate route-to-destination information based on one or more patient verification inputs. In an embodiment, the self-guided patient-support and transport vehicle includes a body structure including a surface configured to support an individual, a transport assembly, a steering assembly, a power source, and a motor. In an embodiment, the transport assembly includes a plurality of rotatable members operable to frictionally interface the vehicle to a travel path and to move the vehicle along the travel path. In an embodiment, the steering assembly is configured to vary a steering angle, an orientation, a velocity, etc., of at least one of the plurality of rotatable members. In an embodiment, the motor is operable to drive one or more of the plurality of rotatable members. In an embodiment, the self-guided patient-support and transport vehicle navigation controller is operably coupled to at least one of the plurality of rotatable members, the power source, and the motor, and configured to generate one or more control commands for navigating the self-guided patient-support and transport vehicle to at least a first target location along a travel route based on the route-to-destination information.

In an aspect, the present disclosure is directed to, among other things, a self-guided patient-support and transport system including one or more self-propelled patient-support and transport vehicles. In an embodiment, each self-propelled patient-support and transport vehicle includes a self-guided-vehicle navigation controller configured to determine position, velocity, acceleration, bearing, direction, rate-of-change of bearing, rate-of-change of direction, etc., of the self-guided patient-support and transport vehicle. In an embodiment, each self-propelled patient-support and transport vehicle includes a self-guided-vehicle navigation controller configured to generate self-guided patient-support and transport vehicle status information based on at least one of a determined position, velocity, acceleration, bearing, direction, rate-of-change of bearing, rate-of-change of direction, etc., of the self-guided patient-support and transport vehicle. In an embodiment, each self-propelled patient-support and transport vehicle includes a self-guided-vehicle navigation controller configured to generate route-to-destination information based on one or more target location inputs and the self-guided patient-support and transport vehicle status information. In an embodiment, each self-propelled patient-support and transport vehicle includes a self-guided-vehicle navigation controller configured to generate one or more control commands for automatically navigating the self-guided patient-support and transport vehicle to a second position along a travel route based on the route-to-destination information.

In an aspect, the present disclosure is directed to, among other things, an article of manufacture including a non-transitory signal-bearing medium bearing one or more instructions that cause a system, computing device, processor, etc., to determine a position, velocity, acceleration, bearing, direction, rate-of-change of bearing, rate-of-change of direction, etc., of a self-guided hospital bed. In an embodiment, the article of manufacture includes a non-transitory signal-bearing medium bearing one or more instructions for generating self-guided hospital bed status information. In an embodiment, the article of manufacture includes a non-transitory signal-bearing medium bearing one or more instructions for generating route-to-destination information based on one or more target location inputs and the self-guided hospital bed status information.

In an aspect, the present disclosure is directed to, among other things, a remotely guided, omnidirectional, self-propelled patient-support vehicle including a vehicle navigation controller having a communication module. In an embodiment, the communication module includes at least one of a receiver, a transmitter, and a transceiver operable to communicate with a remote navigation network and to receive control command information (e.g., route-to-destination data, navigation data, location based control commands, etc.) from the remote navigation network. In an embodiment, a remotely guided, omnidirectional, self-propelled patient-support vehicle includes a route-status module including circuitry operable to provide one or more of travel route image information, patient-support vehicle geographic location information, patient-support vehicle travel direction information, patient-support vehicle travel velocity information, patient-support vehicle propulsion information, or patient-support vehicle braking information.

In an embodiment, a remotely guided, omnidirectional, self-propelled patient-support vehicle includes a body structure operably coupled to the vehicle navigation controller. In an embodiment, the body structure includes a surface configured to support a patient. In an embodiment, the body structure includes a plurality of rotatable members operable to frictionally the patient-support vehicle to a travel path and to move the patient-support vehicle along the travel path In an embodiment, the body structure is operably coupled to a steering assembly operable to vary a steering angle, an orientation, a velocity, etc., of at least one of the plurality of rotatable members. In an embodiment, the self-propelled patient-support vehicle includes a power source operably coupled to one or more of the plurality of rotatable members and a motor operable to drive one or more of the plurality of rotatable members. In an embodiment, the vehicle navigation controller includes a patient destination module for generating one or more control commands for navigating a remotely guided self-propelled patient-support vehicle to at least a first patient destination along a patient travel route based on the control command information from the remote navigation network. In an embodiment, a power source is operably coupled to one or more of the plurality of rotatable members and configured to rotate at least one of the plurality of rotatable members based on the control command information from the remote navigation network.

In an aspect, the present disclosure is directed to, among other things, a remotely guided self-propelled patient-support vehicle including a body structure configured to support a patient in need of transport. In an embodiment, the body structure is operably coupled to a transport assembly including a steering assembly and a power train. In an embodiment, the remotely guided self-propelled patient-support vehicle includes a navigation controller having a communication interface. In an embodiment, the communication interface includes at least one of a receiver, a transmitter, and a transceiver operable to communicate with a remote navigation network. In an embodiment, the communication interface includes at least one of a receiver, a transmitter, and a transceiver operable to receive travel-route information and at least one of propulsion control command information, braking command information, and steering command information from the remote navigation network. In an embodiment, the communication interface includes at least one of a receiver, a transmitter, and a transceiver operable to receive travel-route information necessary to reach a patient destination along a patient travel route. In an embodiment, the vehicle navigation controller is operably coupled to at least one of the transport assembly, the steering assembly, and the power train and configured to generate at least one navigation control command for controlling at least one of propulsion, braking, and steering of a remotely guided self-propelled patient-support vehicle based on the propulsion control command information, the braking command information, or the steering command information from the remote navigation network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 2 is a perspective view of a system including a vehicle for transporting an individual subject according to one embodiment.

FIG. 3 is a perspective view of a system including a vehicle for transporting an individual subject according to one embodiment.

FIG. 4 shows a schematic diagram of an article of manufacture according to one embodiment.

FIG. 5 shows a schematic diagram of an article of manufacture according to one embodiment.

FIG. 6 shows a schematic diagram of an article of manufacture according to one embodiment.

DETAILED DESCRIPTION

Figure 1:
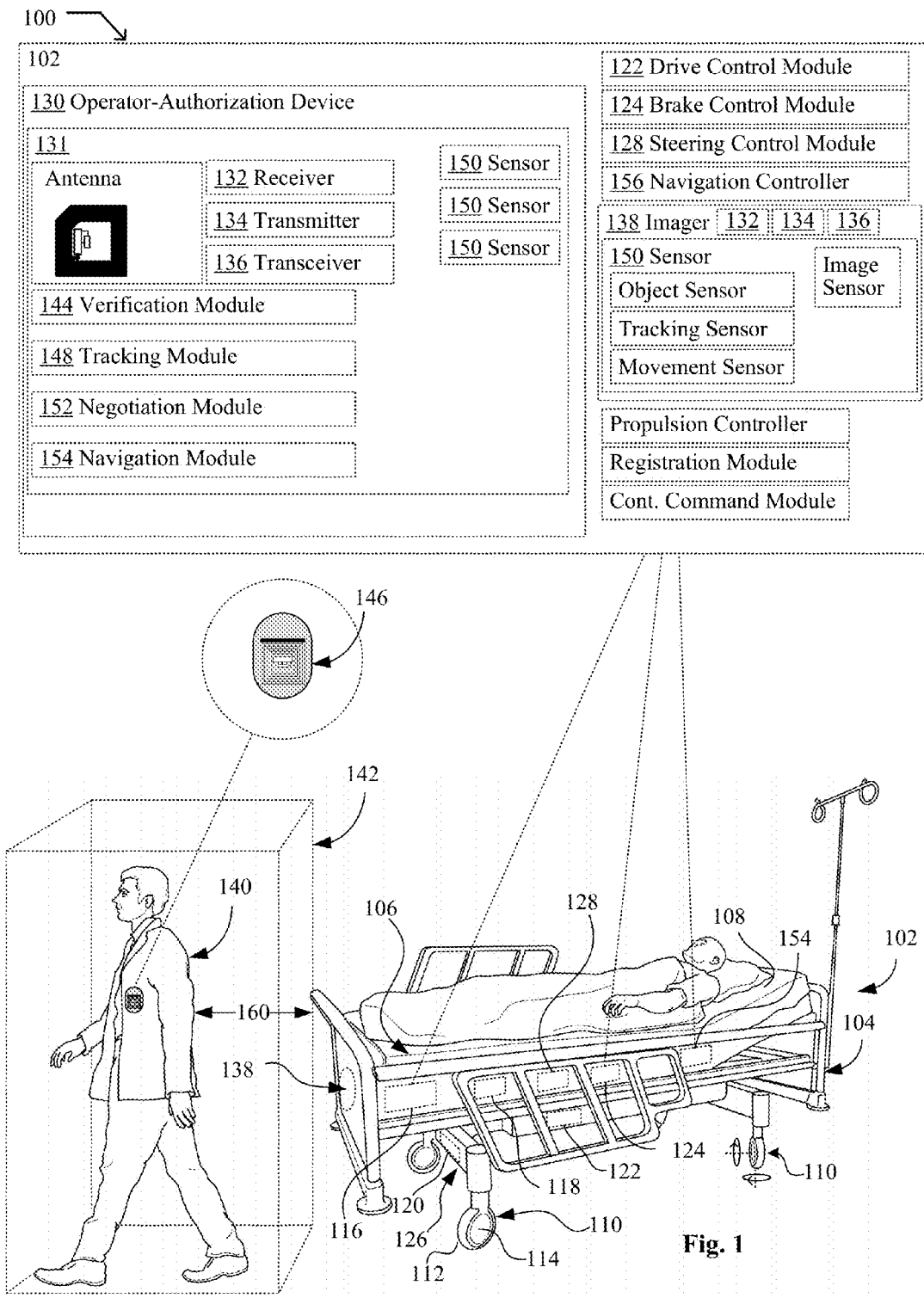
FIG. 1 is a perspective view of a system including a vehicle for transporting an individual subject according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 shows a system 100 (e.g., an operator-guided vehicle system, a self-guided patient-support and transport system, a self-propelled operator-guided vehicle system, a remotely guided patient-support vehicle system, a self-propelled operator-guided vehicle system, a remotely guided, omnidirectional, self-propelled patient-support vehicle system, etc.), in which one or more methodologies or technologies can be implemented such as, for example, an automated vehicle system for transporting and physically supporting patients, an automated patient transport system that responds to an operator guide, a self-propelled hospital bed system, a self-propelled hospital bed system employing image-based navigation, a remotely guided hospital bed system, a remote-controlled patient transport systems, or the like.

In an embodiment, the system 100 includes a transport and support vehicle 102 (e.g., a bed, a gurney, a stretcher, a wheelchair, etc.) for transporting an individual subject (e.g., a patient, a human subject, an animal subject, etc.). For example, in an embodiment, the system 100 includes a transport and support vehicle 102 for transporting a patient from at least a first location to a second location. In an embodiment, the system 100 includes a transport and support vehicle 102 for transporting one or more individual subjects to, from, or within a facility (e.g., a healthcare provider facility, a hospital, a home, a room, etc.), or the like.

In an embodiment, the transport and support vehicle 102 includes a body structure 104 (e.g., a vehicle structure, a bed structure, a bedframe, a steerable body structure, a steerable bed, etc.) including a surface 106 arranged and dimensioned to support an individual subject. For example, in an embodiment, the body structure 104 includes one or more mattress 108, bed decks, patient support structures, body part posturing devices, etc., arranged and dimensioned to support an individual subject.

In an embodiment, the transport and support vehicle 102 includes a plurality of rotatable members 110 operable to frictionally interface the vehicle to a travel path and to move the vehicle along the travel path. Non-limiting examples of rotatable members 110 include wheels 112, casters, ball rollers, continuous tracks, drive wheels, steer wheels, propellers, or the like. In an embodiment, rotatable members 110 include one or more of motors, rotors, hubs, cranks, sprockets, brake assemblies, bearing assemblies, etc. In an embodiment, the transport and support vehicle 102 includes one or more wheels 112. In an embodiment, the transport and support vehicle 102 includes one or more wheels 112, each wheel having an electric wheel hub motor 114. In an embodiment, the pluralities of rotatable members 110 include one or more brushless electric motors. In an embodiment, one or more of the rotatable members 110 are operably coupled to one or more actuators that use an electrical current or magnetic actuating force to vary the motion of a rotating component (e.g., an actuator that rotates an axle coupled to the wheel to give it steering, an actuator that activates a rotating component forming part of an electric brake system, a magnetic bearing, a magnetic torque device, a brushless electric motor, etc. to vary velocity, etc.).

In an embodiment, the transport and support vehicle 102 includes a power source 116 and a motor 118 operably coupled one or more of the plurality of rotatable members 110, and configured to drive one or more of the plurality of rotatable members 110. In an embodiment, the transport and support vehicle 102 includes a powertrain 120 operably coupled to a power source 116. In an embodiment, the powertrain 120 is configured to supply power to one or more power train components to generate power and deliver it to a travel path surface. Non-limiting examples of powertrain components include motors, engines, transmissions, driveshafts, differentials, drive rotatable members, final drive assemblies, or the like. In an embodiment, the transport and support vehicle 102 includes one or more powertrains 120. In an embodiment, the transport and support vehicle 102 includes a powertrain 120 operably coupled to a plurality of rotatable members 110 and configured to cause a change in position, acceleration, direction, momentum, or the like, of the transport and support vehicle 102.

In an embodiment, each rotatable member 110 is operably coupled to a respective powertrain 120 and a steering assembly 126. In an embodiment, each rotatable member 110 can be controlled separately. For example, in an embodiment, a steering angle, an orientation, a velocity, etc., can be controlled separately for each rotatable member 110. In an embodiment, a rotatable member 110 is operably coupled to at least a first electromagnetic motor that drives a rotatable member 110 and a second electromagnetic motor that can steer the rotatable member 110. In an embodiment, each of the first, second, third electromagnetic motor, etc., can be separately controlled for precise movement. In an embodiment, each electromagnetic motor is powered by a battery. In an embodiment a plurality of electromagnetic motors is powered by a single battery.

In an embodiment, one or more of the rotatable members 110 are operably coupled to one or more actuator devices that use an electrical current or magnetic actuating force to vary the motion of a rotating component (e.g., an actuator that rotates an axle coupled to a rotatable member 110 to give it steering, an actuator that activates a rotating component forming part of an electric brake system, actuator devices that use an electrical current or magnetic actuating force to control a magnetic bearing, a magnetic torque device, a brushless electric motor, etc. to vary velocity, etc.).

In an embodiment, the transport and support vehicle 102 includes one or more drive rotatable members 110 operable to receive torque from the powertrain 120. For example, in an embodiment, during operation, one or more drive wheels provide a driving force for the transport and support vehicle 102. In an embodiment, the transport and support vehicle 102 takes the form of a multi-wheel drive transport and support vehicle. For example, in an embodiment, the transport and support vehicle 102 includes a two-wheel drive transport and support vehicle having two driven wheels. In an embodiment, the transport and support vehicle 102 takes the form of a two-wheel drive vehicle, a four-wheel drive vehicle, an all-drive vehicle, or the like. In an embodiment, the transport and support vehicle 102 is configured for omnidirectional travel.

In an embodiment, the transport and support vehicle 102 includes one or more drive control modules 122. In an embodiment, a module includes, among other things, one or more computing devices such as a processor (e.g., a microprocessor), a central processing unit (CPU), a digital signal processor (DSP), an application-specific integrated circuit (ASIC), a field programmable gate array (FPGA), or the like, or any combinations thereof, and can include discrete digital or analog circuit elements or electronics, or combinations thereof. In an embodiment, a module includes one or more ASICs having a plurality of predefined logic components. In an embodiment, a module includes one or more FPGAs, each having a plurality of programmable logic components.

In an embodiment, the drive control modules 122 includes a module having one or more components operably coupled (e.g., communicatively, electromagnetically, magnetically, ultrasonically, optically, inductively, electrically, capacitively coupled, or the like) to each other. In an embodiment, a module includes one or more remotely located components. In an embodiment, remotely located components are operably coupled, for example, via wireless communication. In an embodiment, remotely located components are operably coupled, for example, via one or more receivers 132, transmitters 134, transceivers 136, or the like. In an embodiment, the drive control module 122 includes a module having one or more routines, components, data structures, interfaces, and the like.

In an embodiment, a module includes memory that, for example, stores instructions or information. For example, in an embodiment, at least one control module includes memory that stores operator-guide verification information, operator-guide identification information, operator-guide registration information, patient identification information, navigation plan information, travel path markings information, travel-route status information, vehicle status information, travel-route status information, etc. Non-limiting examples of memory include volatile memory (e.g., Random Access Memory (RAM), Dynamic Random Access Memory (DRAM), or the like), non-volatile memory (e.g., Read-Only Memory (ROM), Electrically Erasable Programmable Read-Only Memory (EEPROM), Compact Disc Read-Only Memory (CD-ROM), or the like), persistent memory, or the like. Further non-limiting examples of memory include Erasable Programmable Read-Only Memory (EPROM), flash memory, or the like. In an embodiment, the memory is coupled to, for example, one or more computing devices by one or more instructions, information, or power buses. In an embodiment, the drive control module 122 includes memory that, for example, stores operator-guide identification information, travel-route status information, or the like. In an embodiment, the operator-authorization device 130 includes memory that, for example, stores object tracking information, operator-zone registration information, control command information, gesture information, or the like.

In an embodiment, a module includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, a module includes one or more user input/output components that are operably coupled to at least one computing device configured to control (electrical, electromechanical, software-implemented, firmware-implemented, or other control, or combinations thereof) at least one parameter associated with, for example, controlling one or more of driving, navigating, braking, or steering the transport and support vehicle 102.

In an embodiment, a module includes a computer-readable media drive or memory slot that is configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as a magnetic tape, floppy disk, a hard disk drive, a Compact Disc (CD), a Digital Video Disk (DVD), Blu-Ray Disc, a digital tape, a computer memory, or the like, as well as transmission type medium such as a digital or an analog communication medium (e.g., a fiber optic cable, a waveguide, a wired communications link, a wireless communication link (e.g., receiver 132, transmitter 134, transceiver 136, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINI-DISC, non-volatile memory card, EEPROM, optical disk, optical storage, RAM, ROM, system memory, web server, or the like.

In an embodiment, the transport and support vehicle 102 is operably coupled to one or more rotatable members 110 having a braking system. The braking system can include, but is not limited to, a disc brake system, an electronic brake system, a drum brake system, or the like. In an embodiment, the transport and support vehicle 102 is operably coupled to one or more rotatable members 110 having a regenerative brake system. In an embodiment, the transport and support vehicle 102 is operably coupled to one or more brake control modules 124.

In an embodiment, the transport and support vehicle 102 is operably coupled to steering assembly 126 having one or more modules, mechanisms, components, linkages, steering gear assemblies, or the like operable to steer the transport and support vehicle 102. In an embodiment, the steering assembly 126 is operable to vary a steering angle, an orientation, a velocity, etc., of at least one of a plurality of rotatable members 110. For example, in an embodiment, the transport and support vehicle 102 is operably coupled to steering assembly 126 having one or more electromechanical elements operable to vary a steering angle, an orientation, a velocity, etc., of at least one of a plurality of rotatable members 110. In an embodiment, the steering assembly 126 is operable to vary a steering angle, an orientation, a velocity, etc., of at least one of a plurality of wheels 112. In an embodiment, the transport and support vehicle 102 is operably coupled to steering assembly 126 having one or more components linkages, steering gear assemblies, rod assemblies, or the like that aid in directing the transport and support vehicle 102 along a target course. In an embodiment, the transport and support vehicle 102 is operably coupled to steering assembly 126 having one or more actuators, electric wheel hub motors, magnetic bearings, magnetic torque devices, brushless electric motors, or the like that aid in directing the transport and support vehicle 102 along a target course.

In an embodiment, for example, the transport and support vehicle 102 is operably coupled to one or more steer wheels operable to change direction of the transport and support vehicle 102. In an embodiment, the steering assembly 126 is operably coupled to power steering assembly.

In an embodiment, the steering assembly 126 includes one or more sensors 150 (e.g., yaw-rate sensors, angular velocity sensors, steering angle sensors, wheel speed sensors, position sensors, etc.). For example, in an embodiment, the steering assembly 126 includes a steering sensor operable to detect a steering angle, orientation, etc., associated with a steered one of the plurality of rotatable members 110. In an embodiment, the steering assembly 126 includes a vehicle velocity sensor operable to detect a velocity of the transport and support vehicle 102. In an embodiment, the steering assembly 126 is operably coupled to vehicle acceleration sensor operable to detect an acceleration of the vehicle. In an embodiment, the steering assembly 126 is operably coupled to vehicle position sensor operable to detect a geographical location of the vehicle. In an embodiment, the steering assembly 126 is operably coupled to rotational rate sensor operable to detect a rate of rotation of the transport and support vehicle 102.

In an embodiment, the transport and support vehicle 102 includes at least three wheels 112, and the steering assembly 126 is operable to vary a steering angle, an orientation, a velocity, etc., of at least one of the at least three wheels 112. In an embodiment, the transport and support vehicle 102 includes one or more steering control modules 128. For example, in an embodiment, the transport and support vehicle 102 includes one or more steering control modules 128 having circuitry operable to vary a steering angle, an orientation, a velocity, etc., of at least one of the plurality of rotatable members 110.

In an embodiment, the transport and support vehicle 102 includes an imager 138 operable to locate an operator (e.g., an authorized operator 140, an off-board operator, an off-board guide, an operator different from the on-board patient, or the like) within operator-guide zone 142 (e.g., an image zone, or the like). In an embodiment, the imager 138 is operably coupled to a power source, such as the power source 116, and the body structure 104, and includes one or more modules having circuitry operable to operate the power source 116 and steering assembly 126 so as to maintain the transport and support vehicle 102 at a target separation from an authorized operator within operator-guide zone 142. In an embodiment, the steering assembly 126 is communicatively coupled, physically coupled, electromagnetically coupled, magnetically coupled, ultrasonically coupled, optically coupled, inductively coupled, electrically coupled, capacitively coupled, wirelessly coupled, or the like) to the imager 138 and is configured to vary a vehicle heading based on one or more inputs from the imager indicative of a change in position by the authorized operator 140. In an embodiment, the steering assembly 126 is communicatively coupled to the imager 138 and is configured to vary a vehicle heading based on a change in position by the authorized operator 140. In an embodiment, the steering assembly 126 is communicatively coupled to the imager 138 and is operable to control a direction of travel based on one or more inputs from the imager indicative of a sensed change in position by the authorized operator 140. In an embodiment, the steering assembly 126 is operable to vary a steering angle, an orientation, a velocity, etc., of at least one of a plurality of rotatable members 110 based on a change in position by the authorized operator 140.

In an embodiment, the imager 138 includes a camera and a facial-recognition module including circuitry configured to locate, identify, authorize, etc., an operator within an operator-guide zone 142. For example, in an embodiment, the imager 138 includes one or more modules having circuitry, such as, one or more sensor 150 (e.g., optical sensors, cameras, radiofrequency sensors, three-dimensional sensors (e.g., 3-D sensors operable to capture information about the shape of a face, etc.) or the like) operable to acquire image information. In an embodiment, during operation, the imager 138 determines an individual's identity by detecting and analyzing distinct features of an individual's face surface (e.g., structural features of the eye sockets, chin, nose, etc.). In an embodiment, the imager 138 includes three-dimensional sensor-based face recognition modalities. For example, in an embodiment, the imager 138 includes one or more infrared light sensor operable to measures depth, position, motion, or the like. In an embodiment, the imager 138 comprises a multimodal biometric sensor for identifying persons, objects, or the like. Various facial-recognition hardware, programs, software, etc., are known and can be used.

In an embodiment, the imager 138 includes an optical camera, a stereo optical camera, or the like. In an embodiment, the imager 138 includes at least one of a radar module having an optical radar, a microwave radar device, Doppler radar device, and the like. In an embodiment, the imager 138 can be used to measure velocity. In an embodiment, the imager 138 includes a rangefinder device (e.g., laser range finder, acoustic range finder, rangefinder camera, sonic ranging module, or the like) to determine the approximate distance of the operator from the vehicle.

In an embodiment, the transport and support vehicle 102 takes the form of a self-propelled operator-guided bed including an operator-authorization device 130. In an embodiment, the operator-authorization device 130 is configured to acquire verification information associated with an operator 140. For example, in an embodiment, the transport and support vehicle 102 is operably coupled to an operator-authorization device 130 having an input interface and one or more modules operable to acquire verification information associated with an operator 140.

In an embodiment, the input interface includes a graphical user interface. In an embodiment, the input interface includes a tablet computing device, a smartphone, or a mobile device. In an embodiment, the input interface includes an information input device, a scanner, a card reader/writer device. In an embodiment, the input interface includes a keyboard, a plug-in subscriber identification module (SIM) card, or a Flash drive. In an embodiment, the input interface includes a wire carrying a coded signal.

In an embodiment, the operator-authorization device 130 is operably coupled to at least one of a receiver 132, a transceiver 134, and a transmitter 136 operable to acquire the verification information associated with the operator 140. In an embodiment, the operator-authorization device 130 includes a graphical user interface. In an embodiment, the operator-authorization device 130 includes a tablet computing device, a smartphone, or a mobile device.

In an embodiment, the input interface includes at least one of a receiver, a transceiver, and a transmitter to acquire the verification information associated with an operator. In an embodiment, the operator-authorization device 130 includes an information input device, a scanner, or a card reader/writer device (e.g., smart-card reader, magnetic swipe card reader, optical card reader, media reader/writer, etc.). In an embodiment, the operator-authorization device 130 includes a verification module 144 for determining whether the operator is an authorized operator 140.

In an embodiment, the operator-authorization device 130 includes a communication interface 131 configured to acquire operator-guide verification information from an identification device 146 associated with an operator-guide. In an embodiment, the operator-authorization device 130 includes routines, components, data structures, interfaces, and the like, operable to acquire operator-guide verification information from an identification device 146 associated with an operator-guide. For example, during operation, a plurality of tracking sensors operably coupled to a tracking module 148 follow, monitor, track, etc., changes in a location of a person carrying the operator-authorization device 130 by monitoring a communication signal from the operator-authorization device 130. Accordingly, in an embodiment, the tracking module 148 is configured to correlate at least one measurand from one or more of the plurality of tracking sensors to one or more physical movements of a user carrying the identification device 146. In an embodiment, the operator-authorization device 130 includes at least one of a receiver 132, a transceiver 134, and a transmitter 136 operable to acquire the verification information associated with the operator-guide.

In an embodiment, the operator-authorization device 130 includes a negotiation module 152 configured to initiate a discovery protocol that allows the operator-authorization device 130 and the identification device 146 associated with the operator-guide to identify each other and negotiate one or more pre-shared keys. For example, in an embodiment, the operator-authorization device 130 includes a negotiation module 152 having routines, components, data structures, interfaces, and the like, operable to initiate a discovery protocol that allows the operator-authorization device 130 and the identification device 146 associated with the operator-guide to identify each other and negotiate one or more pre-shared keys.

In an embodiment, at least one of the operator-authorization device 130 and the identification device 146 is responsive based on at least one of an authorization protocol, an authentication protocol, an activation protocol, a negotiation protocol, and the like. For example, during operation, in an embodiment, at least one of the operator-authorization device 130 and the identification device 146 implements a discovery and a registration protocol that allows the operator-authorization device 130 and the identification device 146 to find each other and negotiate one or more pre-shared keys. This negotiation is implemented using a variety of technologies, methodologies, and modalities including, for example, using aggressive-mode exchanges, main-mode exchanges, quick-mode exchanges, or combinations thereof. In an embodiment, at least one of the operator-authorization device 130 and the identification device 146 is operable to establish an Internet Security Association and Key Management Protocol (ISAKMP) security association (SA), between the operator-authorization device 130 and the identification device 146 using one or more negotiations schemas. Non-limiting examples of negotiation types include aggressive-mode negotiation, main-mode negotiation, quick-mode negotiation, or the like. Further limiting examples of negotiation types include aggressive mode negotiation using pre-shared key authentication followed by quick-mode negotiation, aggressive mode using digital signature authentication followed by quick-mode negotiation, main mode negotiation using digital signature authentication followed by quick-mode negotiation, main mode negotiation using encrypted nonce-based authentication followed by quick-mode negotiation, main mode negotiation using pre-shared key authentication followed by quick-mode negotiation, or the like. In an embodiment, the ISAKMP SA is used to protect subsequent key exchanges between peer devices (e.g., via quick-mode negotiation protocols, or the like).

In an embodiment, at least one of the operator-authorization device 130, the identification device 146, and the other devices disclosed herein operates in a networked environment using connections to one or more remote computing devices (e.g., a common network node, a network computer, a network node, a peer device, a personal computer, a router, a server, a tablet PC, a tablet, etc.) and typically includes many or all of the elements described above. In an embodiment, the connections include connections to a local area network (LAN), a wide area network (WAN), or other networks. In an embodiment, the connections include connections to one or more enterprise-wide computer networks, intranets, and the Internet. In an embodiment, the system 100, the transport and support vehicle 102, the operator-authorization device 130, or the like operate in a cloud computing environment including one or more cloud computing systems (e.g., private cloud computing systems, public cloud computing systems, hybrid cloud computing systems, or the like).

In an embodiment, the operator-authorization device 130 includes at least one of a receiver 132, a transceiver 134, and a transmitter 136 that acquires various information as necessary, including for example, operator-guide identification information, operator-guide authorization status information, and the like. In an embodiment, the operator-authorization device 130 is operably coupled to one or more distal sensors that acquire travel path markings information. In an embodiment, the operator-authorization device 130 includes memory having patient-specific route-to-destination information stored thereon. In an embodiment, operator-authorization device 130 is configured to acquire route-to-destination information. In an embodiment, the operator-authorization device 130 is configured to acquire patient identification information. In an embodiment, the operator-authorization device 130 is configured to acquire self-propelled operator-guided vehicle status information. In an embodiment, the operator-authorization device 130 is configured to acquire travel-route status information.

In an embodiment, the operator-authorization device 130 is operably coupled to the transport assembly and includes one or more sensors operable to detect an operator-guide identification device 146 associated with an operator-guide. In an embodiment, the operator-authorization device 130 includes a communication interface 131 having one or more modules configured to acquire operator-guide verification information from the operator-guide identification device 146. For example, in an embodiment, during operation, the operator-guide identification device 146 is interrogated by an electromagnetic energy signal, an acoustic signal, or the like, generated by the operator-authorization device 130 to elicit an authorization key. Upon authorization, information such as operator-guide authorization status information, operator-guide identity information, operator-guide reference guidance information, operator-guide verification information, physical movement image information, route-to-destination information, vehicle status information, etc., is shared. In an embodiment, once located, identified, authorized, etc. a method includes tracking staff, patients, vehicles, events, or the like to determine a compliance status.

In an embodiment, the operator-authorization device 130 includes one or more modules operable to acquire information indicative of at least one of an operator-guide authorization status, an operator-guide identity, and an operator-guide reference physical movement information. In an embodiment, the operator-authorization device 130 includes one or more modules that generate one or more control commands for causing the transport assembly to maintaining the self-propelled operator-guided vehicle at a target separation from the authorized operator-guide identification device 146 based on the at least one of the operator-guide authorization status, the operator-guide identity, and the operator-guide reference physical movement information.

In an embodiment, the operator-authorization device 130 is configured to acquire navigation plan information (e.g., hospital physical layout information, route information, obstacle information, real-time hospital traffic information, destination information, origination information, etc.) from the operator-guide identification device 146 and to cause the generation of the one or more control commands for causing the transport assembly to maintain the self-propelled operator-guided vehicle at the target separation from the authorized operator-guide identification device 146 based on the navigation plan information.

In an embodiment, operator-authorization device 130 includes a navigation module 154 is operably coupled to the one or more sensors 150 and configured to detect a location of the operator-guide identification device 146 associated with the operator-guide. Non-limiting examples of sensors 150 include acoustic sensors, optical sensors, electromagnetic energy sensors, image sensors, photodiode arrays, charge-coupled devices (CCDs), complementary metal-oxide-semiconductor (CMOS) devices, transducers, optical recognition sensors, infrared sensors, radio frequency components sensors, thermo sensor, or the like. In an embodiment, the operator-authorization device 130 includes a navigation module 154 operably coupled to the one or more sensors 150 and configured to determine a location of the operator-guide identification device 146 relative to the transport and support vehicle 102. In an embodiment, operator-authorization device 130 includes a navigation module 154 operably coupled to the one or more sensors 150 and configured to generate one or more control commands for maintaining the self-propelled operator-guided vehicle at target separation from the operator-guide identification device 146 responsive to a change of location of the operator-guide identification device 146 relative to the transport and support vehicle 102. In an embodiment, the operator-guide identification device 146 includes one or more transducers that detect and convert acoustic signals emitted from the operator-authorization device 130 into electronic signals.

In an embodiment, the transport and support vehicle 102 includes one or more modules operable to register the operator-guide identification device 146 relative to the transport and support vehicle 102 and to generate registration information. In an embodiment, the navigation module 154 is configured to locate, register, and track the operator-guide identification device 146 with at least one operator-guide zone 142, and to generate operator-guide zone registration information. In an embodiment, the navigation module 154 is configured to register the operator-guide identification device 146 relative to one operator-guide zone 142 and to generate registration information and one or more navigation control commands based on the registration information.

In an embodiment, the navigation module 154 is configured to register the operator-guide identification device 146 relative to the transport and support vehicle 102 and to generate registration information. For example, during operation, the navigation module 154 maps (e.g., spatially aligns, registers, projects, correlates, etc.) the geographical location of operator-guide identification device 146 relative to the geographical location of the transport and support vehicle 102. In an embodiment, the navigation module 154 is configured to generate one or more navigation control commands for maintain the transport and support vehicle 102 at a target separation form the operator-guide identification device 146 based on the on the registration information. In an embodiment, the navigation module 154 registers a plurality of objects by mapping coordinates from one object to corresponding points in another object. In an embodiment, the navigation module 154 registers objects (e.g., operator-guide zones, travel path locations, target and reference objects, targets and focal regions, images, etc.) using one or more transformations.

Non-limiting examples of registration techniques or methodologies include deformable registration, landmark-based registration, or rigid registration. See e.g., Paquin et al., *Multiscale Image Registration*, Mathematical Biosciences and Engineering, Vol. 3:2 (2006); see also Paquin, Dana, PhD, *Multiscale Methods for Image Registration*, Ph.D. dissertation, Stanford University (2007); Zitova et al., *Image Registration Methods: a Survey*, Image and Vision Computing (21) pp. 977-1000 (2003); each of which is incorporated herein by reference. In an embodiment, registration includes techniques or methodologies for spatially aligning images taken using different imaging modalities, taken at different times, or that vary in perspective. Further non-limiting examples of registration techniques or methodologies include deformable multiscale registration, hybrid multiscale landmark registration, multiscale image registration, or rigid multiscale registration. In an embodiment, registration includes one or more of feature detection, feature identification, feature matching, or transform modeling. In an embodiment, registration includes mapping features of a first object with the features of a second object. In an embodiment, registration includes determining a point-by-point correspondence between two objects, regions, or the like. In an embodiment, registration includes determining a point-by-point correspondence between an object and a location. For example, in an embodiment, registration includes determining a point-by-point correspondence between an object and an operator-guide zone 142.

In an embodiment, the operator-authorization device 130 includes a navigation module 154 operably coupled to the one or more sensors 150 and configured to generate one or more control commands for maintaining a velocity differences between a transport and support vehicle's 102 and the operator-guide within a target range. In an embodiment, the operator-authorization device 130 includes a navigation module 154 operably coupled to the one or more sensors 150 and configured to generate one or more control commands for maintaining a velocity differences between the transport and support vehicle 102 and the operator-guide within a target range.

In an embodiment, operator-authorization device 130 is configured to generate route-to-destination information responsive to a displacement of the operator-guide identification device 146 relative the transport and support vehicle 102. In an embodiment, operator-authorization device 130 is configured to generate route-to-destination information responsive to a detected velocity difference between the operator-guide identification device 146 and the transport and support vehicle 102. In an embodiment, operator-authorization device 130 is configured to generate one or more control commands for controlling one or more of propulsion, braking, or steering responsive to movement of the operator-guide identification device 146. In an embodiment, operator-authorization device 130 is configured to generate one or more control commands for controlling one or more of propulsion, braking, or steering responsive to movement of the operator-guide identification device 146 responsive to a communication loss between the operator-guide identification device 146 and the transport and support vehicle 102.

In an embodiment, the transport and support vehicle 102 takes the form a self-propelled operator-guided bed including a navigation controller 156 and a bedframe structure. In an embodiment, the navigation controller 156 is configured to register the transport and support vehicle 102 relative to a portion of a travel path and to generate registration information. In an embodiment, the navigation controller 156 is operably coupled to the operator-authorization device 130 and the bedframe structure. In an embodiment, the navigation controller 156 includes one or more navigation modules 154 having circuitry operable to provide a control signal to navigate the bedframe structure along a travel path based on the one or more detected locations of the identification device 146. In an embodiment, the operator-authorization device 130 includes navigation module 154 having circuitry operable to generate and implement one or more control commands for controlling one or more of propulsion, braking, or steering responsive to one or more detected locations of the identification device 146. In an embodiment, the navigation controller 156 include one or more object sensors and is configured to maintain the bedframe structure at a target separation from an object proximate the travel path. In an embodiment, the navigation controller 156 is configured to maintain the bedframe structure at a target separation from a wall proximate the travel path.

In an embodiment, the transport and support system 100 includes one or more self-propelled operator-guided vehicles. In an embodiment, each self-propelled operator-guided vehicle includes a bedframe structure having a surface 106 configured to support a patient, the bedframe structure including a transport assembly having a plurality of rotatable members 110 to frictionally interface the vehicle to a travel path and to move the vehicle along the travel path and a navigation system configured to vary one or more of propulsion, braking, or steering angle of at least one of the plurality of rotatable members 110.

In an embodiment, the transport and support vehicle 102 includes an operator-authorization device 130 having one or more image sensors for acquiring image information of an operator within an operator-guide zone 142. In an embodiment, operator-authorization device 130 includes a verification module 144 for determining whether the operator is an authorized operator 140 based on the image information. In an embodiment, the operator-authorization device 130 includes one or more modules operable to determine one or more of operator-guide identification information or operator-guide authorization status information based on the image information. In an embodiment, the operator-authorization device 130 is configured to determine at least one of operator-guide identification and operator-guide authorization status information based on the one or more detected physical movements of the operator within the operator-guide zone 142.

In an embodiment, the transport and support vehicle 102 includes an operator-guided vehicle navigation controller 156. For example, in an embodiment, the transport and support vehicle 102 includes an operator-guided vehicle navigation controller 156 operably coupled to at least one or more of the operator-authorization device 130, the steering assembly 126, the power source 116, or the motor 118. In an embodiment, the operator-guided vehicle navigation controller 156 includes a control command module operable to determine physical movement information from the image information and to map one or more detected physical movements of the authorized operator 140 within the operator-guide zone 142 to at least one input correlated with one or more navigation control commands for controlling the transport and support vehicle 102 based on the physical movement information. In an embodiment, the operator-guided vehicle navigation controller 156 is configured to navigate the transport and support vehicle 102 based on the one or more navigation control commands. In an embodiment, the operator-guided vehicle navigation controller 156 is responsive to the operator-authorization device 130, and the one or more navigation control commands, for controlling one or more of propulsion, braking, or steering to direct the transport and support vehicle 102 along a travel route.

In an embodiment, the operator-guided vehicle navigation controller 156 is responsive to the operator-authorization device 130, and the one or more navigation control commands, for determining a travel route for the transport and support vehicle 102. In an embodiment, operator-guided vehicle navigation controller 156 is operably coupled to at least one of the one or more image sensors and is configured to determine a travel route based on the one or more detected physical movements of the operator within the operator-guide zone 142. In an embodiment, operator-guided vehicle navigation controller 156 is operably coupled to a geographical positioning system as is configured to determine one or more travel destinations based on the one or more detected physical movements of the operator within the operator-guide zone 142.

In an embodiment, it may be necessary to move a patient to and from various locations, care units, etc., within a care facility. Patients undergoing numerous diagnostic procedures, interventional procedures, etc., may require transport to more than one location. An operator (e.g., a care provider, an orderly, a nurse, at doctor, etc.) may assist the patient onto a transport and support vehicle 102, and to one or more target destinations. More than one operator may be necessary along the way to reach more than one destination. During operation, an operator my approach the transport and support vehicle 102 to guide it to a target destination along a travel route. In an embodiment, a protocol can be activated to determine, for example, whether the operator is authorized to assist that transport and support vehicle 102, whether the correct patient is on the transport and support vehicle 102, a status of one or more travel routes, a status of one or more destination locations, etc., or the like.

In an embodiment, the transport and support vehicle 102 is configured to respond to an operator that will assist it to reach one or more destinations along a travel route. In an embodiment, prior to engaging with the operator, the transport and support vehicle 102 determines whether the operator proximate to the transport and support vehicle 102, within an operator-guide zone 142, etc., is authorized to guide the transport and support vehicle 102 to a destination. For example, in an embodiment, the transport and support vehicle 102 is operably coupled to an operator-authorization device 130 including a verification module 144 for determining whether the operator is an authorized operator 140. In an embodiment, the verification module 144 includes circuitry for determining whether the physical coupling member associated with the at least one human corresponds to an authorized operator 140. In an embodiment, the operator-authorization device 130 is operably coupled to communication interface 131 configured to acquire operator-guide verification information from an identification device 146 associated with an operator-guide. In an embodiment, the operator-authorization device 130 is operably coupled to an imager 138 including a camera and a facial-recognition module having circuitry configured to locate, identify, authorize, etc., an operator within an operator-guide zone 142.

Once it has been determined that an operator is an authorized operator 140 of the transport and support vehicle 102, the operator-authorization device 130 is operable to enable an automatic controlled state, a manual controlled state, an operator-guided state, or remote controlled state of the transport and support vehicle 102. For example, in an embodiment, in an operator-guided state, the transport and support vehicle 102 determines navigation control commands for controlling the transport and support vehicle 102 based on gesture information, movement information, or the like, associated with an authorized operator 140.

In an embodiment, the operator-authorization device 130 is operably coupled to a steering assembly 126 that varies a vehicle heading based on one or more inputs from the imager 138 indicative of a change in position by the authorized operator 140. In an embodiment, the operator-authorization device 130 is operably coupled to a navigation module 154 that generates one or more control commands for maintaining the self-propelled operator-guided vehicle at target separation from the operator-guide identification device 146 responsive to a change of location of the operator-guide identification device 146 relative to the transport and support vehicle 102. In an embodiment, the operator-authorization device 130 is operably coupled to one or more sensors 150 that image and track a movement of a least a portion of the operator within the operator-guide zone 142, and generates one or more navigation control commands for controlling the transport and support vehicle 102 based on a measurand indicative of change in position of the portion of the operator.

Accordingly, in an embodiment, the authorized operator 140 assist, guides, controls, actuates, etc., the patient transport and support vehicle 102 to one or more target destinations along a travel route.

Referring to FIG. 2, in an embodiment, the transport and support vehicle 102 includes a virtual object generator 202. For example, in an embodiment, the transport and support vehicle 102 includes a virtual object generator 202 operably coupled to the operator-guide vehicle navigation controller 156. In an embodiment, during operation, the virtual object generator 202 is configured to generate a virtual representation 204 of at least one of a locality 206 of the operator within the operator-guide zone 142 and a locality the transport and support vehicle 102 within a physical space on a virtual display 206. In an embodiment, the operator-authorization device 130 is configured to track at least a portion of the operator within the operator-guide zone 142 and to update a virtual object 208 in a virtual space corresponding to the physical location of at least one of the transport and support vehicle 102 and the portion of the operator within the operator-guide zone 142. In an embodiment, the transport and support vehicle 102 includes a virtual object generator 202 operably coupled to the operator-guide vehicle navigation controller 156 and configured to generate a virtual representation 210 of the one or more navigation control commands on a virtual display.

In an embodiment, the transport and support vehicle 102 includes a virtual object generator 202 operably coupled to the operator-guide vehicle navigation controller 156 and configured to generate a virtual representation 212 corresponding to the physical location of the transport and support vehicle 102 on a virtual display. In an embodiment, the transport and support vehicle 102 includes a virtual object generator 202 operably coupled to the operator-guide vehicle navigation controller 156 and configured to generate a virtual representation 214 corresponding to the portion of the operator within the operator-guide zone 142 on a virtual display. In an embodiment, the operator-authorization device 130 is configured to image one or more physical movements of the operator 140 within the operator-guide zone 142 responsive to the image information and to update a virtual object 210 in a virtual space corresponding to the one or more physical movements of the operator within the operator-guide zone 142.

In an embodiment, the transport and support vehicle 102 includes one or more sensors 150 that image and track a movement of a least a portion of the operator within the operator-guide zone 142. For example, in an embodiment, the operator-guided vehicle navigation controller 156 includes a navigation module 154 that is operably coupled to the one or more movement recognition and tracking sensors and is configured to generate one or more navigation control commands for controlling the transport and support vehicle 102 based on a measurand indicative of change in position of the portion of the operator. In an embodiment, the operator-guided vehicle navigation controller 156 is operable to generate one or more control commands for maintaining a separation 160 between the transport and support vehicle 102 and the operator within the operator-guide zone 142 within a target range. In an embodiment, the operator-guided vehicle navigation controller 156 is operable to generate one or more control commands for maintaining a velocity difference between the transport and support vehicle 102 and the operator within the operator-guide zone 142 within a target range.

In an embodiment, the transport and support vehicle 102 includes one or more sensors 150 that image and track a movement of a least a portion of the operator within an operator-guide zone 142 while the operator is proximate a side, front, or rear portion of the transport and support vehicle 102. For example, in an embodiment, the transport and support vehicle 102 includes one or more movement recognition and tracking sensors that image and real-time track at least a portion of the operator while the operator is proximate a side, front, or rear portion of the transport and support vehicle 102. In an embodiment, the transport and support vehicle 102 includes one or more movement recognition and tracking sensors that image and real-time track at least a portion of the operator within the operator-guide zone 142. In an embodiment, the transport and support vehicle 102 includes one or more sensors 150 that determine proximity information (e.g., signal strength, propagation time, phase change, etc.) indicative of a transport and support vehicle 102 location relative to an operator within the operator-guide zone 142. In an embodiment, the transport and support vehicle 102 includes one or more movement recognition and tracking sensors operable to image one or more hand or arms gestures of the operator. In an embodiment, the transport and support vehicle 102 includes one or more movement recognition and tracking sensors operable to image one or more hand or arms gestures of an authorized operator 140, an operator, an guide, an operator different from the on-board patient, or the like. Non-limiting examples of movement recognition and tracking sensors include optical sensors, cameras, radiofrequency sensors, three-dimensional sensors, electro-optical sensors, infra-red sensors, network of sensors, distributed set of sensors, location sensors, etc. In an embodiment, the transport and support vehicle 102 takes the form of transport and support vehicle 102. In an embodiment, the operator-guided vehicle navigation controller 156 is operably coupled to the one or more movement recognition and tracking sensors and is configured to determine gestures information from image information and to map the one or more hand or arms gestures of the operator within the operator-guide zone 142 to at least one input correlated with one or more navigation control commands for controlling the transport and support vehicle 102 based on the gesture information.

In an embodiment, the operator-guided vehicle navigation controller 156 is operable to enable an automatic controlled state, a manual controlled state, an operator-guided state, or remote controlled state of the transport and support vehicle 102 based on a measurand from the one or more movement recognition and tracking sensors indicative that operator is not within the operator-guide zone 142. In an embodiment, the operator-guided vehicle navigation controller 156 operable to initiate a standby mode, based on a measurand from the one or more movement recognition and tracking sensors indicative that operator is absent from the operator-guide zone 142. In an embodiment, the operator-guided vehicle navigation controller 156 operable to initiate a no-operator protocol, based on a measurand from the one or more movement recognition and tracking sensors indicative that an authorized operator 140 is not within the operator-guide zone 142.

In an embodiment, the transport and support vehicle 102 includes self-propelled hospital bed navigation control system that includes an operator-guided vehicle navigation controller 156 including a navigation module 154 having one or more sensors 150 operable to detect at least one operator within an operator-guide zone 142.

In an embodiment, the transport and support vehicle includes a bedframe structure. In an embodiment, the bedframe structure includes a surface 106 arranged and dimensioned to support an individual subject. In an embodiment, the plurality of rotatable members 110 is adapted and configured to frictionally interface the vehicle to a travel path and to move the vehicle along the travel path. In an embodiment, the steering assembly 126 operable to vary a steering angle, an orientation, a velocity, etc., of at least one of the plurality of rotatable members 110. In an embodiment, the power source 116 and the motor 118 are operable to drive the one or more of the plurality of rotatable members 110.

In an embodiment, the operator-guided vehicle navigation controller 156 is configured to detect the at least one operator within an operator-guide zone 142 located proximate the self-propelled hospital bed based on at least one measurand from the one or more sensors 150. In an embodiment, the operator-guided vehicle navigation controller 156 is configured to detect the at least one operator within an operator-guide zone 142 located proximate a side portion of the self-propelled hospital bed based on at least one measurand from the one or more sensors 150. In an embodiment, the operator-guided vehicle navigation controller 156 is configured to detect the at least one operator within an operator-guide zone 142 located proximate a distal portion of the self-propelled hospital bed based on at least one measurand from the one or more sensors 150. In an embodiment, the operator-guided vehicle navigation controller 156 includes at least one communication interface 131 configured to detect an identification device 146 associated with the at least one operator based on at least one measurand from the one or more sensors 150.

In an embodiment, the operator-guided vehicle navigation controller 156 includes one or more optical sensors operable to detect an optical authorization signal from an identification device 146 associated with the at least one operator. In an embodiment, the operator-guided vehicle navigation controller 156 includes one or more transducers operable to detect an acoustic authorization signal from an identification device 146 associated with the at least one operator. In an embodiment, the operator-guided vehicle navigation controller 156 includes one or more imagers 138 to acquire an image of a human proximate the self-propelled hospital bed or of a badge associated with the at least one operator. In an embodiment, the operator-guided vehicle navigation controller 156 is operably coupled to a device associated with the at least one operator via an input-or-output port, the navigation controller 156. In an embodiment, the operator-guided vehicle navigation controller 156 is operably connected to a physical coupling member associated with the at least one operator via an input-or-output port.

In an embodiment, the operator-guided vehicle navigation controller 156 includes a verification module 144 including circuitry for determining whether the physical coupling member associated with the at least one human corresponds to an authorized operator 140. In an embodiment, the operator-guided vehicle navigation controller 156 includes a communication interface 131 operable to initiating a discovery protocol that allows the operator-guided vehicle navigation controller 156 and an identification device 146 associated with the at least one operator to identify each other and negotiate one or more pre-shared keys. In an embodiment, the operator-guided vehicle navigation controller 156 includes at least one a receiver 132, transmitter 134, or transceiver 136 configured to detect an identification device 146 associated with the at least one operator. In an embodiment, the operator-guided vehicle navigation controller 156 includes one or more electromagnetic energy sensors that detect a wireless signal from identification device 146 associated with at least one operator. In an embodiment, the operator-guided vehicle navigation controller 156 includes one or more optical sensors configured to detect radiation reflected form one or more retro-reflector elements associated with the at least one operator. In an embodiment, the operator-guided vehicle navigation controller 156 includes one or more optical sensors configured to detect radiation reflected from one or more retro-reflector elements along a travel path.

In an embodiment, the transport and support vehicle 102 includes an operator movement mapping module. For example, in an embodiment, the transport and support vehicle 102 includes an operator movement mapping module operably coupled to the operator-guided vehicle navigation controller 156 and to at least one of the plurality of rotatable members 110, the power source 116, and the motor 118. In an embodiment, the operator movement mapping module is operable to map one or more physical movements of the operator within the operator-guide zone 142 to at least one input correlated with one or more navigation control commands for controlling the transport and support vehicle 102. In an embodiment, the operator movement mapping module is operable to generate a control signal to at least one of the plurality of rotatable members 110, the power source 116, and the motor 118 to navigate the transport and support vehicle 102 based on the one or more navigation control commands.

In an embodiment, the operator movement mapping module includes circuitry configured to map one or more gestures of the human operator within the operator-guide zone to at least one input correlated with one or more navigation control commands for controlling the self-propelled operator-guided vehicle, and to generate a control signal to at least one of the plurality of rotatable members 110, the power source 116, and the motor 118 to navigate the self-propelled operator-guided vehicle based on the one or more navigation control commands.

In an embodiment, the operator movement mapping module includes circuitry configured to map one or more physical movements of the human operator resulting in a change in separation distance of the human operator within the operator-guide zone from the bed, to at least one input correlated with one or more navigation control commands for controlling the self-propelled operator-guided vehicle, and to generate a control signal to at least one of the plurality of rotatable members 110, the power source 116, and the motor 118 to navigate the self-propelled operator-guided vehicle based on the one or more navigation control commands.

Referring to FIG. 3, in an embodiment, the transport and support vehicle 102 includes a fail-safe control system 300. For example, in an embodiment, the fail-safe control system 300 include one or more fail-safe devices 302 that physically couple the transport and support vehicle 102 to the at least one operator 140. In an embodiment, the transport and support vehicle 102 includes a fail-safe control system 300 having a fail-safe module 308 including circuitry operable to activate a fail-safe protocol when the operator 140 is no longer detected. For example, during operation, the operator 140 couples an information carrier 304 to an interface port 306 of the transport and support vehicle 102. Upon coupling, a verification module 144 determines whether the operator 140 is an authorized operator. In an embodiment, the fail-safe control system 300 is operable to activate a fail-safe protocol during a fail-safe mode of operation. For example, in an embodiment, the fail-safe control system 300 is operable to activate a fail-safe protocol responsive to an indication that the transport and support vehicle 102 and the at least one operator are no longer physically coupled via the fail-safe control system 300. In an embodiment, the fail-safe control system 300 includes one or more modules operable to activate a fail-safe protocol when the information carrier 304 is no longer detected. In an embodiment, fail-safe control system 300 includes a connection assembly for coupling the operator-guided transport and support vehicle 102 to a physical coupling member associated with the least one operator. In an embodiment, the fail-safe control system 300 is operable to activate a fail-safe protocol when the coupling to the physical coupling member is lost. In an embodiment, the transport and support vehicle 102 includes a fail-safe control system 300 having an input-or-output interface to operably connect an information carrier 304 associated with the at least one operator 140 to the operator-guided vehicle navigation controller 156.

In an embodiment, the transport and support vehicle 102 includes an audio input recognition control device 310 (e.g., voice-command recognition device, speech recognition device, audio tone control input device, etc.) including one or more acoustic sensor operable to recognize speech input, and to generate a transport route based on the speech input. In an embodiment, the transport and support vehicle 102 includes an audio-activated control module 312 operable to receive an audio input and to correlate the audio input to at least one navigation control command for controlling at least one of propulsion, braking, and steering of the transport and support vehicle 102.

In an embodiment, the transport and support vehicle 102 includes an audio control module 314 operably coupled to the operator-guided vehicle navigation controller 156 and configured to receive one or more voice command inputs from the operator and to identify one or more potential matching symbols for the one or more voice commands. In an embodiment, the potential one or more matching symbols include at least one navigation control command for controlling the transport and support vehicle 102. In an embodiment, the potential one or more matching symbols include at least one navigation control command for controlling a destination of the transport and support vehicle 102. In an embodiment, the potential one or more matching symbols include at least one navigation control command for controlling an orientation of the transport and support vehicle 102. In an embodiment, the potential one or more matching symbols include at least one navigation control command for controlling at least one of propulsion, braking, and steering of the transport and support vehicle 102.

In an embodiment, the transport and support vehicle 102 includes a voice-command recognition device 316 including a voice-command control module 318 having one or more transducers operable to recognize an operator-specific input, receive one or more speech inputs, and generate transport route information based on the one or more speech inputs. In an embodiment, the transport and support vehicle 102 includes a speech recognition device 318 including one or more speech control modules 320 operable to correlate speech input to at least one navigation control command for controlling at least one of propulsion, braking, and steering of the transport and support vehicle 102.

In an embodiment, the transport and support vehicle 102 includes one or more navigation systems (e.g., a laser navigation system, an optical navigation system, a sonic navigation system, a vision navigation system, etc.). In an embodiment, the transport and support vehicle 102 includes a navigation system including one or more navigation modules. For example, in an embodiment, the transport and support vehicle 102 includes a navigation module having a global position circuitry for detecting a geographical location of the transport and support vehicle 102.

In an embodiment, the transport and support vehicle 102 includes an optical navigation system operably coupled to the operator-guided vehicle navigation controller 156 and including one or more electromagnetic energy sensors. In an embodiment, the operator-guided vehicle navigation controller 156 configured to generate a control signal to at least one of the plurality of rotatable members 110, the power source 116, and the motor 118 to navigate the transport and support vehicle 102 based on one or more measurands outputs from the optical navigation system.

In an embodiment, the transport and support vehicle 102 includes an inertial navigation system operably coupled to the operator-guided vehicle navigation controller 156, and including one or more motion sensors or rotation sensors. In an embodiment, the operator-guided vehicle navigation controller 156 is configured to generate at least one of position information, orientation information, and velocity information based on one or more measurands outputs from the inertial navigation system. In an embodiment, the transport and support vehicle 102 includes a collision avoidance system operably coupled to the operator-guided vehicle navigation controller 156 and including one or more sensors 150 operable to detect a travel path condition. In an embodiment, the operator-guided vehicle navigation controller 156 configured to generate a control signal to at least one of the plurality of rotatable members 110, the power source 116, and the motor 118 to navigate the transport and support vehicle 102 based on one or more measurands outputs from the collision avoidance system.

In an embodiment, the transport and support vehicle 102 includes a collision avoidance system operably coupled to the operator-guided vehicle navigation controller 156 and including one or more sensors 150 operable to detect a travel path condition. In an embodiment, the operator-guided vehicle navigation controller 156 is configured to generate a control signal to control at least one of propulsion, braking, and steering of the transport and support vehicle 102 based on one or more measurands outputs from the collision avoidance system. In an embodiment, the transport and support vehicle 102 includes one or more moment of inertia sensors operably coupled to the operator-guided vehicle navigation controller 156. In an embodiment, the operator-guided vehicle navigation controller 156 configured to generate one or more navigation control commands for controlling the transport and support vehicle 102 based on at least one measurand from the one or more moment of inertia sensor. In an embodiment, the transport and support vehicle 102 includes one or more weight sensors operably coupled to the operator-guided vehicle navigation controller 156, the operator-guided vehicle navigation controller 156 configured to generate one or more navigation control commands for controlling the transport and support vehicle 102 based on at least one measurand from the one or more weight sensors 150.

In an embodiment, the transport and support vehicle 102 includes a plurality of distance measuring sensors for determining a travel distance from a location on the transport and support vehicle 102 to a remote object. In an embodiment, the transport and support vehicle 102 includes a plurality of travel-path sensors for detecting a remote object along a travel path of the transport and support vehicle 102. In an embodiment, the transport and support vehicle 102 includes an audio-activated control module 312 operable to receive an audio input. For example, in an embodiment, the operator-guided vehicle navigation controller 156 includes an audio input mapping module having circuitry operable to correlate the audio input to at least one navigation control command for controlling at least one of propulsion, braking, and steering of the transport and support vehicle 102.

In an embodiment, the transport and support vehicle 102 includes a plurality of wheels 112, each wheel having an electric wheel hub motor 114 such that, during operation. In an embodiment, the operator-guided vehicle navigation controller 156 varies an applied current to each electric wheel hub motor 114 based on an audio input.

In an embodiment, the audio-activated control module 312 is operable to receive one or more voice command inputs from an operator and to identify one or more potential matching symbols for the one or more voice commands. In an embodiment, the one or more potential matching symbols including at least one navigation control command for controlling at least one of propulsion, braking, and steering of the transport and support vehicle 102. In an embodiment, the audio-activated control module 312 includes a voice-command recognition device 316 including one or more transducers operable to detect an operator-specific input and to generate transport route based on the operator-specific input. In an embodiment, the audio-activated control module 312 includes a speech recognition device 318 configured to correlate speech input to at least one navigation control command for controlling at least one of propulsion, braking, and steering of the transport and support vehicle 102. In an embodiment, the audio-activated control module 312 includes a speech recognition device 318 configured to correlate speech input to one or more navigation control commands for controlling a steering angle of at least one of the plurality of rotatable members 110.

In an embodiment, the transport and support vehicle 102 includes an operator-guided vehicle navigation controller 156 including an audio-activated control module 312 having one or more transducers operable to receive an audio input, and an audio input mapping module including circuitry operable to correlate the audio input to at least one navigation control command for controlling at least one of propulsion, braking, and steering of the transport and support vehicle 102. In an embodiment, the audio-activated control module 312 includes one or more modules having circuitry operable to receive one or more voice command inputs from an operator and to generate one or more potential matching symbols for the one or more voice commands. In an embodiment, the one or more potential matching symbols including at least one navigation control command for controlling at least one of propulsion, braking, and steering of the transport and support vehicle 102.

In an embodiment, the audio-activated control module 312 includes a voice-command recognition device 316 including one or more transducers operable to acquire an operator-specific input. In an embodiment, the audio-activated control module 312 is configured to generate transport route based on the operator-specific input. In an embodiment, the audio-activated control module 312 includes a speech recognition device 318 configured to correlate speech input to at least one navigation control command for controlling at least one of propulsion, braking, and steering of the transport and support vehicle 102.

In an embodiment, the transport and support vehicle 102 includes an operator-guide verification and navigation controller 156 including one or more sensors operable to acquire at least one digital image of an operator within an operator-guide zone 142. In an embodiment, the operator-guide verification and navigation controller 156 includes one or more modules having circuitry operable to map one or more physical movements of the operator within the operator-guide zone 142 and imaged in the at least one digital image to at least one input correlated with one or more navigation control commands for controlling the transport and support vehicle 102. In an embodiment, the operator-guide verification and navigation controller 156 is configured to navigate the transport and support vehicle 102 to at least a first location responsive to the one or more navigation control commands.

In an embodiment, the transport and support vehicle 102 includes an operator-authorization device 130 including one or more sensors that detect one or more physical movements of the operator within the operator-guide zone 142. In an embodiment, the transport and support vehicle 102 includes a self-propelled operator-guided vehicle navigation controller 156 having a computing device and memory to provide a control signal to map the one or more physical movements of the operator within the operator-guide zone 142 to at least one input correlated with one or more navigation control commands for controlling the transport and support vehicle 102. In an embodiment, the transport and support vehicle 102 includes a self-propelled operator-guided vehicle navigation controller 156 having a computing device and memory to provide a control signal to navigate a transport and support vehicle 102 based on the one or more navigation control commands.

In an embodiment, the transport and support vehicle 102 includes a real-time object recognition device configured to identify groups of pixels indicative of one or more physical movements associated with an operator within an operator-guide zone 142 imaged in the at least one digital image. For example, in an embodiment, the transport and support vehicle 102 includes a real-time object recognition device including one or more modules having circuitry configured to identify groups of pixels indicative of one or more physical movements associated with an operator within an operator-guide zone 142 imaged in the at least one digital image. In an embodiment, the transport and support vehicle 102 includes a real-time object recognition device configured to generate one or more connected components of a graph representative of groups of pixels indicative of the one or more physical movements associated with the operator imaged in the at least one digital image. In an embodiment, the transport and support vehicle 102 includes a real-time object recognition device configured to correlate the one or more connected components of the graph to at least one input associated with one or more navigation control commands for controlling the transport and support vehicle 102.

In an embodiment, the transport and support vehicle 102 includes a self-guided-vehicle navigation controller 156 having a route-to-destination control module including circuitry operable to generate route-to-destination information based on one or more patient verification inputs. In an embodiment, the self-guided-vehicle navigation controller 156 includes a travel-route status acquisition circuit operable to acquire real-time travel-route status information. In an embodiment, the self-guided-vehicle navigation controller 156 includes an alternate route-to-destination generation circuit operable to generate route-to-destination information responsive to the travel-route status information indicative of an adverse condition present along the travel route. In an embodiment, the self-guided-vehicle navigation controller 156 includes an optical guidance system configured to determine the first position of a transport and support vehicle 102.

In an embodiment, the self-guided-vehicle navigation controller 156 includes circuitry operable to generate one or more control commands for navigating the transport and support vehicle 102 along a multi-floor travel route. In an embodiment, the self-guided-vehicle navigation controller 156 is operably coupled to at least one of the plurality of rotatable members 110, the power source 116, and the motor 118, and configured to generate one or more control commands for navigating the transport and support vehicle 102 to at least a first target location along a travel route based on a patient verification input. In an embodiment, the self-guided-vehicle navigation controller 156 is operably coupled to at least one of the plurality of rotatable members 110, the power source 116, and the motor 118, and configured to generate one or more control commands for navigating the transport and support vehicle 102 to at least a first target location along a travel route based on one or more inputs indicative of a change in health status of a patient being transported.

In an embodiment, the transport and support vehicle 102 includes one or more memory device structures having travel route information or object along travel route information stored thereon. In an embodiment, the transport and support vehicle 102 includes one or more memories having reference travel route information stored thereon. In an embodiment, the self-guided-vehicle navigation controller 156 includes a communication interface 131 configured to request real-time path traffic status information and to update the route-to-destination information based on the response to the request real-time path traffic status information. In an embodiment, the self-guided-vehicle navigation controller 156 is configured to generate one or more control commands for controlling one or more of propulsion, braking, or steering responsive to an input from one or more sensors operably coupled to the self-guided-vehicle navigation controller 156 and configured to detect a location of a remote object along a travel route.

In an embodiment, the self-guided-vehicle navigation controller 156 is configured to generate one or more control commands for navigating the transport and support vehicle 102 to at least a first target location along a travel route based on the route-to-destination information. For example, in an embodiment, the self-guided-vehicle navigation controller 156 is operably coupled to at least one of the plurality of rotatable members 110, the power source 116, and the motor 118 and is configured to generate one or more control commands for navigating the transport and support vehicle 102 to at least a first target location along a travel route based on the route-to-destination information.

In an embodiment, the route-to-destination control module includes a patient-in-route circuit configured to acquire travel-route status information, the travel-route status information to be acquired including one or more of travel-route traffic information, travel-route obstacle location information, travel-route map information, or travel-route geographical location information, and to generate updated route-to-destination information responsive to the travel-route status information. In an embodiment, the route-to-destination control module includes a patient-in-route circuit configured to report transport and support vehicle 102 location information along one or more target travel-route locations. In an embodiment, the route-to-destination control module includes a patient-in-route circuit configured to report self-guided patient-support and transport location arrival information.

In an embodiment, the transport and support vehicle 102 includes a navigation module having one or more sensors 150 to determine a position, velocity, or acceleration of the transport and support vehicle 102. In an embodiment, the inertial navigation module configured to generate transport and support vehicle 102 status information responsive to changes to the position, velocity, or acceleration of the transport and support vehicle 102.

In an embodiment, the transport and support vehicle 102 includes a navigation module including one or more sensors 150 to determine a bearing, a direction, a rate-of-change of bearing, or a rate-of-change of direction of the self-guided patient-support vehicle. In an embodiment, the inertial navigation module configured to generate transport and support vehicle 102 status information responsive to a change to the bearing, the direction, the rate-of-change of bearing, or the rate-of-change of direction of the transport and support vehicle 102.

In an embodiment, the transport and support vehicle 102 includes a voice-command recognition device 316 operably coupled to the self-guided-vehicle navigation controller 156 and having one or more audio sensors operable to recognize an audio input. In an embodiment, the self-guided-vehicle navigation controller 156 is configured to generate one or more control commands based on the audio input.

In an embodiment, the transport and support vehicle 102 includes a voice-command recognition device 316 including one or more audio sensors operable to recognize an operator-specific audio input and to enable an automatic controlled state, a manual controlled state, an operator-guided state, or remote controlled state of the self-guided-vehicle navigation controller 156 based on the audio input. In an embodiment, the voice-command recognition device 316 configured to enable an automatic controlled state, a manual controlled state, an operator-guided state, or remote controlled state of the self-guided-vehicle navigation controller 156 based on the audio input In an embodiment, the transport and support vehicle 102 includes one or more weight sensors or moments of inertia sensor, such that, during operation, the self-guided-vehicle navigation controller 156 is configured to determine weight information or a moment of inertia information, and one or more control commands for navigating the transport and support vehicle 102 to a second position along a travel route based on at least one of the weight information and the moment of inertia information.

In an embodiment, the transport and support vehicle 102 includes one or more sensors 150 configured to detect one or more travel path markings along a travel path and to generate travel path markings information. In an embodiment, the self-guided-vehicle navigation controller 156 is configured to generate route-to-destination information based on one or more target location inputs and the travel path makings information. In an embodiment, the transport and support vehicle 102 includes one or more sensors 150 configured to detect one or more travel path markings along a travel path and to generate travel path makings information, the self-guided-vehicle navigation controller 156 configured to generate registration information for real-time registering of the transport and support vehicle 102 relative to the one or more travel path markings. In an embodiment, the self-guided-vehicle navigation controller 156 configured to register the transport and support vehicle 102 relative to the one or more travel path markings.

In an embodiment, a self-guided patient-support and transport system, includes one or more transport and support vehicle 102, each transport and support vehicle 102 including a self-guided-vehicle navigation controller 156 configured to determine a position, velocity, acceleration, bearing, direction, or a rate-of-change of bearing, or rate-of-change of direction of the transport and support vehicle 102 and generate transport and support vehicle 102 status information. In an embodiment, a self-guided patient-support and transport system includes one or more transport and support vehicle 102, each transport and support vehicle 102 including a self-guided-vehicle navigation controller 156 configured to generate route-to-destination information based on one or more target location inputs and the transport and support vehicle 102 status information. In an embodiment, a self-guided patient-support and transport system, includes one or more transport and support vehicle 102, each transport and support vehicle 102 including a self-guided-vehicle navigation controller 156 configured to generate one or more control commands for automatically navigating the transport and support vehicle 102 to a second position along a travel route based on the route-to-destination information.

In an embodiment, a remotely guided, omnidirectional, transport and support vehicle 102 includes a vehicle navigation controller 156 including a communication module having at least one of a receiver 132, transmitter 134, and transceiver 136 operable to communicate with a remote navigation network and to receive control command information (e.g., route-to-destination information, navigation information, location based control commands, etc.) from the remote navigation network. In an embodiment, the vehicle navigation controller 156 includes a route-status module including circuitry operable to provide one or more of travel route image information, patient-support vehicle geographic location information, patient-support vehicle travel direction information, patient-support vehicle travel velocity information, patient-support vehicle propulsion information, or patient-support vehicle braking information.

In an embodiment, the vehicle navigation controller 156 is operably coupled to at least one of a body structure, a plurality of rotatable members 110, a steering assembly 126, a power source 116, and a motor 118. In an embodiment, the vehicle navigation controller 156 is configured to generate one or more control commands for navigating a remotely guided, self-propelled, transport and support vehicle 102 to at least a first patient destination along a patient travel route based on the control command information from the remote navigation network. For example, in an embodiment, the vehicle navigation controller 156 includes a patient destination module for generating one or more control commands for navigating a remotely guided, self-propelled, transport and support vehicle 102 to at least a first patient destination along a patient travel route based on the control command information from the remote navigation network.

In an embodiment, the vehicle navigation controller 156 is configured to navigate to a target patient destination satisfying a threshold criterion responsive to receipt of the control command information responsive to control command information received from the remote navigation network. In an embodiment, the vehicle navigation controller 156 is configured to navigate to a target patient destination responsive to control command information received from the remote navigation network. In an embodiment, the vehicle navigation controller 156 is configured to switch from an automatic controlled state, a manual controlled state, an operator-guided state, or a remote controlled state to a different one of the automatic controlled state, the manual controlled state, or the remote controlled state, responsive to control command information received from the remote navigation network.

In an embodiment, the transport and support vehicle 102 includes one or more travel route sensors 150 operably coupled to the vehicle navigation controller 156. In an embodiment, the one or more travel route sensors 150 are configured to detect a travel distance of at least one travel increment along the patient travel route. In an embodiment, the vehicle navigation controller 156 is configured to determine one or more of a total travel distance, a travel direction, or a travel velocity based on the travel distance of the at least one travel increment along the patient travel route. In an embodiment, the vehicle navigation controller 156 is configured to generate one or more control commands for varying one or more of propulsion, braking, or steering to direct the transport and support vehicle 102 along the target patient travel route based on the travel distance of the at least one travel increment along the patient travel route.

In an embodiment, the transport and support vehicle 102 includes a speech recognition module that causes the vehicle navigation controller 156 to execute one or more control commands for navigating a remotely guided, self-propelled, transport and support vehicle 102 to a subsequent travel position along a patient travel route responsive to an input from the speech recognition module. In an embodiment, the transport and support vehicle 102 includes a speech recognition module that causes the vehicle navigation controller 156 to execute one or more control commands for toggling between two or more control states. In an embodiment, the transport and support vehicle 102 includes one or more travel route sensors 150 that generate at least one measurand indicative of movement of a remotely guided, self-propelled, transport and support vehicle 102 to a surface region traversed by a remotely guided, self-propelled, transport and support vehicle 102 and generate vehicle displacement information based on the at least one measurand indicative of movement. In an embodiment, the transport and support vehicle 102 includes at least one traction wheel for propelling a remotely guided, self-propelled, transport and support vehicle 102 along a travel route.

In an embodiment, the vehicle navigation controller 156 includes one or more system sub-controllers. In an embodiment, the vehicle navigation controller 156 is operably coupled to one or more of propulsion controllers, braking controllers, or steering controllers. In an embodiment, the vehicle navigation controller 156 includes one or more of propulsion controllers, braking controllers, or steering controllers. In an embodiment, the vehicle navigation controller 156 is operably coupled to one or more of a propulsion system, a brake system, or a steering system of a remotely guided, self-propelled, transport and support vehicle 102. In an embodiment, the vehicle navigation controller 156 is operably coupled to one or more of a propulsion system, a brake system, or a steering system of a remotely guided, self-propelled, transport and support vehicle 102 and is operable to switch the state of at least one of the propulsion system, the brake system, and the steering system from an automatic controlled state, a manual controlled state, an operator-guided state, or a remote controlled state, to a different one of the automatic controlled state, the manual controlled state, or the remote controlled state.

In an embodiment, the vehicle navigation controller 156 is operable to connect to a local area network (LAN), a wide area network (WAN), an enterprise-wide computer network, an enterprise-wide intranet, or the Internet. In an embodiment, a remotely guided, transport and support vehicle 102 includes a body structure having a transport assembly having a steering assembly 126 and a power train. In an embodiment, the transport and support vehicle 102 includes a vehicle navigation controller 156 including a communication interface 131 having at least one of a receiver 132, transmitter 134, and transceiver 136 operable to communicate with a remote navigation network and to receive travel-route information and at least one of propulsion control command information, braking command information, or steering command information from the remote navigation network so as to reach a patient destination along a patient travel route. In an embodiment, the vehicle navigation controller 156 is operably coupled to at least one of transport assembly, steering assembly 126, and power train, and configured to generate at least one navigation control command for controlling at least one of propulsion, braking, and steering of a remotely guided, self-propelled, transport and support vehicle 102 based on the propulsion control command information, the braking command information, or the steering command information from the remote navigation network.

In an embodiment, the vehicle navigation controller 156 is configured to generate one or more control commands for navigating a remotely guided, self-propelled, transport and support vehicle 102 to at least a first patient travel position responsive to the travel-route information and the at least one of propulsion control command information, braking command information, and steering command information from the remote navigation network. In an embodiment, the transport and support vehicle 102 includes one or more travel route sensors 150 that monitor a distance traveled by a remotely guided, self-propelled, transport and support vehicle 102. In an embodiment, the vehicle navigation controller 156 is configured to generate a plurality of target travel increments corresponding to a patient travel route to a patient destination.

In an embodiment, the transport and support vehicle 102 includes a self-propelled patient-support status reporter device including one or more transceivers or transmitters that generate an output indicative of an authorization to operate the self-propelled patient-support and transport vehicle. In an embodiment, the vehicle navigation controller 156 is configured to execute one or more navigation control commands for controlling one or more of propulsion, braking, or steering to direct the transport and support vehicle 102 along the patient travel route responsive to the travel-route information and the at least one of propulsion control command information, braking command information, and steering command information from the remote navigation network.

Referring to FIG. 4, in an embodiment, an article of manufacture 402 includes a non-transitory signal-bearing medium bearing one or more instructions for detecting an operator-guide identification device 146 associated with operator-guide. In an embodiment, an article of manufacture 402 includes a non-transitory signal-bearing medium bearing one or more instructions for acquiring operator-guide verification information from the operator-guide identification device 146. In an embodiment, the operator-authorization device 130 to be acquired including information indicative of at least one of an operator-guide authorization status, an operator-guide identity, and an operator-guide reference guidance information. In an embodiment, an article of manufacture 402 includes a non-transitory signal-bearing medium bearing one or more instructions for generating one or more control commands for maintaining a self-propelled operator-guided vehicle at target separation from the operator-guide identification device 146. In an embodiment, an article of manufacture 402 includes a non-transitory signal-bearing medium bearing one or more instructions for detecting a location of the operator-guide identification device 146 associated with the operator-guide.

In an embodiment, an article of manufacture 402 includes a non-transitory signal-bearing medium bearing one or more instructions for generating one or more control commands for maintaining the self-propelled operator-guided vehicle at a target separation from the operator-guide identification device 146 responsive to a change of location of the operator-guide identification device 146 relative to the self-propelled operator-guided vehicle. In an embodiment, an article of manufacture 402 includes a non-transitory signal-bearing medium bearing one or more instructions for determining a location of the operator-guide identification device 146 associated with the operator-guide relative to the self-propelled operator-guided vehicle. In an embodiment, an article of manufacture 402 includes a non-transitory signal-bearing medium bearing one or more instructions for determining a velocity difference between the operator-guide identification device 146 and the self-propelled operator-guided vehicle. In an embodiment, an article of manufacture 402 includes a non-transitory signal-bearing medium bearing one or more instructions for controlling one or more of propulsion, braking, or steering responsive to detected velocity difference between the operator-guide identification device 146 and the self-propelled operator-guided vehicle.

Referring to FIG. 5, in an embodiment, an article of manufacture 502 includes a non-transitory signal-bearing medium bearing one or more instructions for acquiring physical movement image information of an operator within an operator-guide zone 142. In an embodiment, an article of manufacture 502 includes a non-transitory signal-bearing medium bearing one or more instructions for determining operator-guide verification information for the operator within the operator-guide zone 142 based on the physical movement image information. In an embodiment, an article of manufacture 502 includes a non-transitory signal-bearing medium bearing one or more instructions for mapping one or more physical movements of the operator within the operator-guide zone 142 to at least one input correlated with one or more navigation control commands for controlling a self-propelled operator-guided bed.

In an embodiment, an article of manufacture 502 includes a non-transitory signal-bearing medium bearing one or more instructions for navigating the self-propelled operator-guided bed based on the one or more navigation control commands. In an embodiment, an article of manufacture 502 includes a non-transitory signal-bearing medium bearing one or more instructions for generating a virtual representation of at least one of a locality of the operator within the operator-guide zone 142 and a locality the self-propelled operator-guided bed on a virtual display 206. In an embodiment, an article of manufacture 502 includes a non-transitory signal-bearing medium bearing one or more instructions for generating a virtual representation of the one or more physical movements on a virtual display 206. In an embodiment, an article of manufacture 502 includes a non-transitory signal-bearing medium bearing one or more instructions for generating a virtual representation of the one or more navigation control commands on a virtual display 206.

In an embodiment, an article of manufacture 502 includes a non-transitory signal-bearing medium bearing one or more instructions for determining a travel route based on one or more detected physical movements of the operator within the operator-guide zone 142. In an embodiment, an article of manufacture 502 includes a non-transitory signal-bearing medium bearing one or more instructions for determining at least a first travel destination based on the one or more detected physical movements of the operator within the operator-guide zone 142. In an embodiment, an article of manufacture 502 includes a non-transitory signal-bearing medium bearing one or more instructions for registering a physical location of the operator within the operator-guide zone 142 relative the self-propelled operator-guided bed, and generating registration information. In an embodiment, an article of manufacture 502 includes a non-transitory signal-bearing medium bearing one or more instructions for generating a virtual representation of at least one of a locality of the operator within the operator-guide zone 142 and a locality the self-propelled operator-guided bed within a physical space on a virtual display 206 based on the registration information. In an embodiment, an article of manufacture 502 includes a non-transitory signal-bearing medium bearing one or more instructions for controlling one or more of propulsion, braking, or steering of the self-propelled operator-guided bed based on the at least one input.

Referring to FIG. 6, in an embodiment, an article of manufacture 602 includes a non-transitory signal-bearing medium bearing one or more instructions for determining a position, velocity, acceleration, bearing, direction, rate-of-change of bearing, rate-of-change of direction, etc., of a self-guided hospital bed. In an embodiment, an article of manufacture 602 includes a non-transitory signal-bearing medium bearing one or more instructions for generating self-guided hospital bed status information. In an embodiment, an article of manufacture 602 includes a non-transitory signal-bearing medium bearing one or more instructions for generating route-to-destination information based on one or more target location inputs and the self-guided hospital bed status information. In an embodiment, an article of manufacture 602 includes a non-transitory signal-bearing medium bearing one or more instructions for generating one or more control commands for navigating the self-guided hospital bed to a second position along a travel route based on the route-to-destination information. In an embodiment, an article of manufacture 602 includes a non-transitory signal-bearing medium bearing one or more instructions for enabling at least one of remote control, manual control, and automatic control of at least one of a propulsion system, braking system, and steering system of the self-guided hospital bed based on the position, velocity, acceleration, bearing, direction, rate-of-change of bearing, or rate-of-change of direction of the self-guided hospital bed.

The claims, description, and drawings of this application may describe one or more of the instant technologies in operational/functional language, for example as a set of operations to be performed by a computer. Such operational/functional description in most instances can be specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions are representative of static or sequenced specifications of various hardware elements. This is true because tools available to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer-programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In an embodiment, if a high-level programming language is the tool used to implement a technical disclosure in the form of functions/operations, it can be understood that, far from being abstract, imprecise, "fuzzy," or "mental" in any significant semantic sense, such a tool is instead a near incomprehensibly precise sequential specification of specific computational—machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory devices, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. Accordingly, any such operational/functional technical descriptions may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, it can be recognizes that a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

At least a portion of the devices or processes described herein can be integrated into an information processing system. An information processing system generally includes one or more of a system unit housing, a video display device, memory, such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), or control systems including feedback loops and control motors (e.g., feedback for detecting position or velocity, control motors for moving or adjusting components or quantities). An information processing system can be implemented utilizing suitable commercially available components, such as those typically found in data computing/communication or network computing/communication systems.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes or systems or other technologies described herein can be effected (e.g., hardware, software, firmware, etc., in one or more machines or articles of manufacture), and that the preferred vehicle will vary with the context in which the processes, systems, other technologies, etc., are deployed. For example, if an implementer determines that speed and accuracy are paramount, the implementer may opt for a mainly hardware or firmware vehicle; alternatively, if flexibility is paramount, the implementer may opt for a mainly software implementation that is implemented in one or more machines or articles of manufacture; or, yet again alternatively, the implementer may opt for some combination of hardware, software, firmware, etc. in one or more machines or articles of manufacture. Hence, there are several possible vehicles by which the processes, devices, other technologies, etc., described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. In an embodiment, optical aspects of implementations will typically employ optically-oriented hardware, software, firmware, etc., in one or more machines or articles of manufacture.

The herein described subject matter sometimes illustrates different components contained within, or connected with, different other components. It is to be understood that such depicted architectures are merely examples, and that in fact, many other architectures can be implemented that achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably coupleable," to each other to achieve the desired functionality. Specific examples of operably coupleable include, but are not limited to, physically mateable, physically interacting components, wirelessly interactable, wirelessly interacting components, logically interacting, logically interactable components, etc.

In an embodiment, one or more components may be referred to herein as "configured to," "configurable to," "operable/operative to," "adapted/adaptable," "able to," "conformable/conformed to," etc. Such terms (e.g., "configured to") can generally encompass active-state components, or inactive-state components, or standby-state components, unless context requires otherwise.

The foregoing detailed description has set forth various embodiments of the devices or processes via the use of block diagrams, flowcharts, or examples. Insofar as such block diagrams, flowcharts, or examples contain one or more functions or operations, it will be understood by the reader that each function or operation within such block diagrams, flowcharts, or examples can be implemented, individually or collectively, by a wide range of hardware, software, firmware in one or more machines or articles of manufacture, or virtually any combination thereof. Further, the use of "Start," "End," or "Stop" blocks in the block diagrams is not intended to indicate a limitation on the beginning or end of any functions in the diagram. Such flowcharts or diagrams may be incorporated into other flowcharts or diagrams where additional functions are performed before or after the functions shown in the diagrams of this application. In an embodiment, several portions of the subject matter described herein is implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal-bearing medium used to actually carry out the distribution. Non-limiting examples of a signal-bearing medium include the following: a recordable type medium such as a floppy disk, a hard disk drive, a Compact Disc (CD), a Digital Video Disk (DVD), a digital tape, a computer memory, etc.; and a transmission type medium such as a digital or an analog communication medium (e.g., a fiber optic cable, a waveguide, a wired communications link, a wireless communication link (e.g., transmitter, receiver, transmission logic, reception logic, etc.), etc.).

While particular aspects of the present subject matter described herein have been shown and described, it will be apparent to the reader that, based upon the teachings herein, changes and modifications can be made without departing from the subject matter described herein and its broader aspects and, therefore, the appended claims are to encompass within their scope all such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of the convention (e.g., "a system having at least one of A, B, or C" would include but not be limited to systems that have A alone, B alone, C alone, A and B together, A and C together, B and C together, and/or A, B, and C together, etc.). Typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, the operations recited therein generally may be performed in any order. Also, although various operational flows are presented in a sequence(s), it should be understood that the various operations may be performed in orders other than those that are illustrated, or may be performed concurrently. Examples of such alternate orderings includes overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A remotely guided omnidirectional self-propelled patient-support vehicle, comprising:
    a vehicle navigation controller including
    a communication module having at least one of a receiver, a transmitter, and a transceiver operable to communicate with a remote navigation network and to receive control command information from the remote navigation network, and
    a route-status module including circuitry operable to provide one or more of travel route image information, patient-support vehicle geographic location information, patient-support vehicle travel direction information, patient-support vehicle travel velocity information, patient-support vehicle propulsion information, or patient-support vehicle braking information; and
    a body structure operably coupled to the vehicle navigation controller, the body structure including
    a surface configured to support a patient,
    a plurality of rotatable members operable to frictionally the patient-support vehicle to a travel path and to move the patient-support vehicle along the travel path,
    a steering assembly operable to vary a steering angle of at least one of the plurality of rotatable members,
    a power source operably coupled to one or more of the plurality of rotatable members, and
    a motor to drive one or more of the plurality of rotatable members;
    the vehicle navigation controller including a patient destination module for generating one or more control commands for navigating the remotely guided self-propelled patient-support vehicle to at least a first patient destination along a patient travel route based on the control command information from the remote navigation network.

2. The remotely guided omnidirectional self-propelled patient-support vehicle of claim 1, wherein the vehicle navigation controller is configured to navigate to a target patient destination satisfying a threshold criterion responsive to receipt of the control command information responsive to control command information received from the remote navigation network.

3. The remotely guided omnidirectional self-propelled patient-support vehicle 1, wherein the vehicle navigation controller is configured to navigate to a target patient destination responsive to control command information received from the remote navigation network.

4. The remotely guided omnidirectional self-propelled patient-support vehicle of claim 1, wherein the vehicle navigation controller is configured to switch from an automatic controlled state, a manual controlled state, an operator-guided state, or a remote controlled state to a different one of the automatic controlled state, the manual controlled state, or the remote controlled state, responsive to control command information received from the remote navigation network.

5. The remotely guided omnidirectional self-propelled patient-support vehicle of claim 1, further comprising:
    one or more travel route sensors operably coupled to the vehicle navigation controller, the one or more travel route sensors configured to detect a travel distance of at least one travel increment along the patient travel route;

the vehicle navigation controller configured to
    determine one or more of a total travel distance, a travel direction, or a travel velocity based on the travel distance of the at least one travel increment along the patient travel route; and to
    generate one or more control commands for varying one or more of propulsion, braking, or steering to direct the self-propelled operator-guided vehicle along the target patient travel route based on the travel distance of the at least one travel increment along the patient travel route.

6. The remotely guided omnidirectional self-propelled patient-support vehicle of claim 1, further comprising:
    a speech recognition module that causes the vehicle navigation controller to execute one or more control commands for navigating the remotely guided self-propelled patient-support vehicle to a subsequent travel position along a patient travel route responsive to an input from the speech recognition module.

7. The remotely guided omnidirectional self-propelled patient-support vehicle of claim 1, further comprising:
    a speech recognition module that causes the vehicle navigation controller to execute one or more control commands for toggling between two or more control states.

8. The remotely guided omnidirectional self-propelled patient-support vehicle of claim 1, further comprising:
    one or more travel route sensors that generate at least one measurand indicative of movement of the remotely guided self-propelled patient-support vehicle relative to a surface region traversed by the remotely guided self-propelled patient-support vehicle and generate vehicle displacement information based on the at least one measurand indicative of movement.

9. The remotely guided omnidirectional self-propelled patient-support vehicle of claim 1, wherein the plurality of rotatable members includes at least one traction wheel for propelling the remotely guided omnidirectional self-propelled patient-support vehicle along a travel route.

10. The remotely guided omnidirectional self-propelled patient-support vehicle of claim 1, wherein the vehicle navigation controller includes one or more system sub-controllers.

11. The remotely guided omnidirectional self-propelled patient-support vehicle of claim 1, wherein the vehicle navigation controller is operably coupled to one or more of propulsion controllers, braking controllers, or steering controllers.

12. The remotely guided omnidirectional self-propelled patient-support vehicle of claim 1, wherein the vehicle navigation controller includes one or more of propulsion controllers, braking controllers, or steering controllers.

13. The remotely guided omnidirectional self-propelled patient-support vehicle of claim 1, wherein the vehicle navigation controller is operably coupled to one or more of a propulsion system, a brake system, or a steering system of the remotely guided omnidirectional self-propelled patient-support vehicle.

14. The remotely guided omnidirectional self-propelled patient-support vehicle of claim 1, wherein the vehicle navigation controller is operably coupled to one or more of a propulsion system, a brake system, or a steering system of the remotely guided omnidirectional self-propelled patient-support vehicle and is operable to switch the state of at least one of the propulsion system, the brake system, and the steering system from an automatic controlled state, a manual controlled state, an operator-guided state, or a remote controlled state, to a different one of the automatic controlled state, the manual controlled state, or the remote controlled state.

15. The remotely guided omnidirectional self-propelled patient-support vehicle of claim 1, wherein the vehicle navigation controller is operable to connect to a local area network (LAN), a wide area network (WAN), an enterprise-wide computer network, an enterprise-wide intranet, or the Internet.

16. A remotely guided self-propelled patient-support vehicle, comprising:
    a body structure configured to support a patient in need of transport, the body structure including a transport assembly having a steering assembly and a power train; and
    a vehicle navigation controller including a communication interface having at least one of a receiver, a transmitter, and a transceiver operable to communicate with a remote navigation network and to receive travel-route information and at least one of propulsion control command information, braking command information, and steering command information from the remote navigation network so as to reach a patient destination along a patient travel route;
    the vehicle navigation controller operably coupled to at least one of the transport assembly, the steering assembly, and the power train and configured to generate at least one navigation control command for controlling at least one of propulsion, braking, and steering of the remotely guided self-propelled patient-support vehicle based on the propulsion control command information, the braking command information, or the steering command information from the remote navigation network.

17. The remotely guided self-propelled patient-support vehicle of claim 16, wherein the vehicle navigation controller is configured to generate one or more control commands for navigating the remotely guided self-propelled patient-support vehicle to at least a first patient travel position responsive to the travel-route information and the at least one of propulsion control command information, braking command information, and steering command information from the remote navigation network.

18. The remotely guided self-propelled patient-support vehicle of claim 16, further comprising:
    one or more travel route sensors that monitor a distance traveled by the remotely guided self-propelled patient-support vehicle.

19. The remotely guided self-propelled patient-support vehicle of claim 16, wherein the vehicle navigation controller is configured to generate a plurality of target travel increments corresponding to a patient travel route to a patient destination.

20. The remotely guided self-propelled patient-support vehicle of claim 16, further comprising:
    a self-propelled patient-support status reporter device including one or more transceivers or transmitters that generate an output indicative of an authorization to operate the self-propelled patient-support and transport vehicle.

21. The remotely guided self-propelled patient-support vehicle of claim 16, wherein the vehicle navigation controller is configured to execute one or more navigation control commands for controlling one or more of propulsion, braking, or steering to direct the self-propelled operator-guided vehicle along the patient travel route responsive to the travel-route information and the at least one of propulsion control command information, braking command information, and steering command information from the remote navigation network.

\* \* \* \* \*